US010113687B2

(12) United States Patent
Wise

(10) Patent No.: US 10,113,687 B2
(45) Date of Patent: Oct. 30, 2018

(54) TELEVISION SAFETY MOUNT

(71) Applicant: George Wise, Fredericksburg, VA (US)

(72) Inventor: George Wise, Fredericksburg, VA (US)

(*) Notice: Subject to any disclaimer, the term of this patent is extended or adjusted under 35 U.S.C. 154(b) by 0 days.

(21) Appl. No.: 15/412,063

(22) Filed: Jan. 23, 2017

(65) Prior Publication Data
US 2018/0209580 A1    Jul. 26, 2018

(51) Int. Cl.
*F16M 11/00* (2006.01)
*F16M 13/02* (2006.01)
*A47B 97/00* (2006.01)

(52) U.S. Cl.
CPC ............ *F16M 13/02* (2013.01); *A47B 97/00* (2013.01); *A47B 2097/005* (2013.01); *A47B 2097/008* (2013.01); *A47B 2220/0036* (2013.01)

(58) Field of Classification Search
CPC ........ F16M 11/10; F16M 13/02; A47B 97/00; A47B 2097/005
USPC ................................................. 248/351, 201
See application file for complete search history.

(56) References Cited

U.S. PATENT DOCUMENTS

| 7,175,149 B2 | 2/2007 | Gallien |
| 7,185,872 B2 | 3/2007 | Lowenstein, Jr. |
| 7,530,538 B2* | 5/2009 | Whalen ................ A47B 81/061 108/50.01 |
| 7,740,218 B2* | 6/2010 | Green .................... F16M 11/10 248/121 |
| 8,087,624 B2* | 1/2012 | Varney ................... F16M 11/10 248/125.8 |
| 9,631,769 B2* | 4/2017 | McGowan ............. A47B 21/06 |
| 9,683,696 B2* | 6/2017 | McCullough ........ F16M 13/022 |
| 9,709,216 B2* | 7/2017 | Zing ....................... F16M 13/02 |
| 9,872,564 B2* | 1/2018 | Tsuyuki ................. A47B 97/00 |
| 9,877,585 B2* | 1/2018 | Sekine ................... A47B 97/00 |
| 2011/0101179 A1 | 5/2011 | Fritch |

FOREIGN PATENT DOCUMENTS

CA           2312680 A1    12/2000

* cited by examiner

*Primary Examiner* — Todd M Epps
(74) *Attorney, Agent, or Firm* — Gregory M. MacDonald, Esq.

(57) ABSTRACT

The present invention relates generally to a device that stabilizes a television to a dresser and a dresser to a nearby wall or stationary surface. The present invention comprises at least one wall mount and wall bracket, at least one television mount and television bracket, at least one dresser mount, and at least one at least one dresser plate.

At least one television bracket connects a television or similar device to a dresser or similar object. The dresser mounting plate connects at least one television bracket and at least one dresser bracket to a dresser. At least one wall mount engages with at least one dresser bracket and secures the position of the dresser or similar object, and consequently the flat screen television or similar device to a wall. The present invention prevents the falling of both the television or similar device and the dresser or similar object.

14 Claims, 31 Drawing Sheets

TELEVISION SAFETY MOUNT

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention generally relates to a safety mount. More specifically, the present invention relates to a safety mount to prevent a television from moving or tipping over when placed on a dresser.

2. Description of Related Art

Suspending a flat screen television to a wall usually includes a variety of mounts and fasteners in order to ensure the television is securely fastened to protect it from falling and injuring nearby persons. These safety measures are typically not taken into account when a television is placed on a flat surface such as that of a dresser, table, or countertop. As a result, there is a risk that a television on such a surface may fall over and damage the unit or injure a person. While some accidents are fixable, like a broken television screen or a chipped dresser, other accidents are dangerous causing serious injury or death.

One difficulty of preventing a flat screen television with a narrow footprint from tipping over is that the dresser may shake when the drawers are opened and closed, causing the television to wobble and tip over. Also, an unsecured television may be stolen, especially if it is located in a public place.

Existing devices that may prevent a flat screen television from tipping over are expensive, heavy, cumbersome, and difficult to install. In addition, existing devices often require a variety of mounts that depend on the size of the television and the mounting height.

Accordingly, there is a need for a device that prevents a flat screen television from tipping over that is inexpensive, lightweight, or easy to install. The device described in this patent application fulfills at least one of these needs or creates other utility.

BRIEF SUMMARY OF THE INVENTION

It is a principal object to solve at least one of the disadvantages with other attempted solutions or to create other utility by providing a device that stabilizes a flat screen television or similar device on a dresser or a similar object that is inexpensive, lightweight, universal, theft-proof, or which may be quickly or easily installed.

The present invention serves to stabilize a flat screen television or similar device on a dresser or similar object with respect to a nearby wall or other stationary surface. The present invention is a universal mount that may affix to a variety of televisions to a dresser, and the dresser to a nearby wall or stationary surface. In addition to stabilizing a television, the present invention may also stabilize three-dimensional televisions, 3D TVs, high-definition televisions, HDTV, three-dimensional high-definition televisions, 3D HDTV, televisions with integrated media or game units, flat-panel displays, flat-screen displays, computer monitors, monitors with integrated computers, all-in-one computer screens, electronic and non-electronic picture frames, laptops, notebooks, 2-in-1 computers, tablet computers, digital screens integrated with an appliance, and any present or future device that is capable of tipping over or falling off of a dresser or similar object. In addition to stabilizing a dresser, the present invention may also stabilize similar objects such as a bookcase, wall unit, hutch, armoire, cabinet, cupboard, bureau, chest of drawers, sideboard, buffet, credenza, highboy, tallboy, wardrobe, chiffonier, china cabinet, file cabinet, medicine cabinet, fireplace mantel, and any other movable fixture such as a table or stand.

The present invention comprises at least one television mount, at least one television bracket, at least one dresser mount, at least one wall mount and at least one wall bracket or a combination thereof. Optionally, a television plate, dresser plate, and wall plate may be used.

The television bracket is located between the television and the dresser. Each television bracket may comprise either a single arm or an upper and lower stabilizing arm. At one end, the television bracket connects to a dresser mount. At the other end, the television bracket connects to a television mount, which then connects to a television or similar device. Each television mount comprises at least one mounting plate, at least one arm, and at least one mounting hole to connect to the television with a fastener or another type of connection. Optionally, the television mount may first connect to a television plate, which then connects to the television. The television plate may comprise a plurality of holes so that the television mounts may be connected at a multitude of connection points.

The wall bracket is located between the wall and the dresser. Each wall bracket may comprise either a single arm or the combination of two or more stabilizing arms. At one end, the wall bracket connects to a dresser mount. At the other end, the wall bracket connects to a wall mount, which then connects to a wall or other surface. Each wall mount comprises at least one mounting plate, at least one arm, and at least one mounting hole to connect to a wall with a fastener or another type of connection. Optionally, the wall mount may first connect to a wall plate, which then connects to the wall. The wall plate may comprise a plurality of holes so that the wall mounts may be connected at a multitude of connection points.

The dresser mounts may connect to a dresser or similar piece of furniture. Each dresser mount comprises at least one mounting plate, at least one arm, and at least one mounting hole to connect to a dresser with a fastener or another type of connection. Optionally, the dresser mount may first connect to a dresser plate, which then connects to a dresser. The dresser plate may comprise a plurality of holes so that the dresser mounts may be connected at a multitude of connection points. There are also optional side plates, which comprises a plurality of holes, on both sides of the dresser plate. These plates allow greater freedom as to the connection point for the dresser mounts.

As a result, the television is secured to the dresser, and the dresser is secured to a wall. Accordingly, the present invention prevents both the dresser from moving and the television from tipping over.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
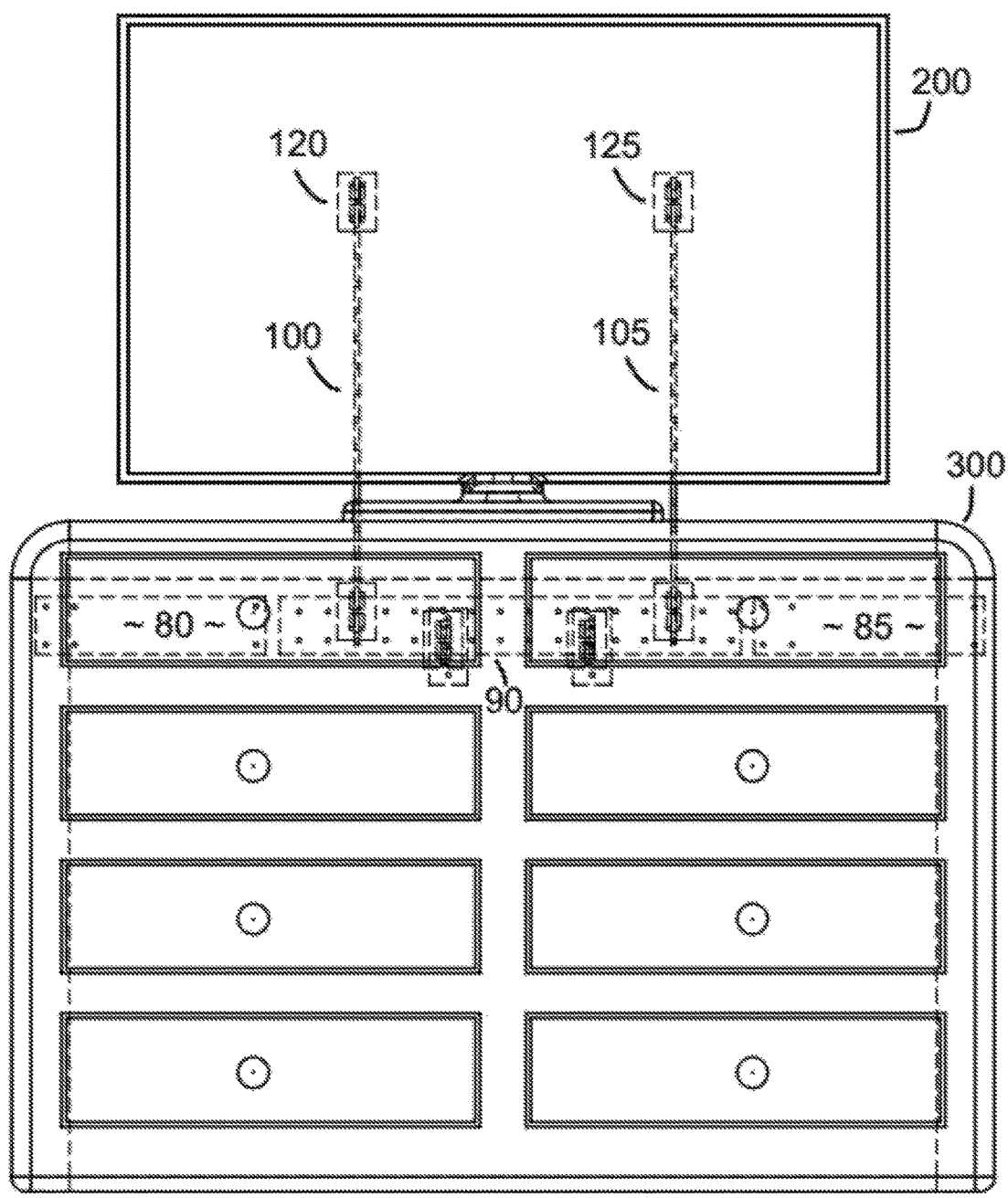
FIG. 1 is a front view of the present invention, where dashed lines represent the hidden portions of the device, which are obscured by the television and dresser in which at least one of the embodiments of this invention is implemented.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

All illustrations are for the purpose of describing selected versions of the present invention and are not intended to limit the scope of the present invention.

The present invention comprises at least one television mount, at least one television bracket, at least one dresser mount, at least one wall bracket and at least one wall mount or a combination thereof. Optionally, a television plate, dresser plate, and wall plate may be used. The device as shown in the embodiment depicted in the drawings comprises wall mounting plates 10 and 15; wall mounts 20 and 25; wall brackets 30 and 35; dresser mounts 40, 45, 70, and 75; dresser mounting plate 50, 55, 60, and 65; left side dresser plate 80, right side dresser plate 85, and center dresser plate 90, along with television brackets 100 and 105, television mounts 110 and 15, and television mounting plates 120 and 125.

The wall mounting plates 10 and 15, dresser mounting plate 50, 55, 60, and 65, and television mounting plates 120 and 125 may have a length of approximately ½-inch to 12-inches, a width of ½-inch to 12-inches, and a thickness of 1/32-inch to 12-inches. The wall mounts 20 and 25, dresser mounts 40, 45, 70, and 75, and television mounts 110 and 115 may have a length of approximately ½-inch to 12-inches, a width of ½-inch to 12-inches, and a thickness of 1/32-inch to 12-inches. The left side dresser plate 80, right side dresser plate 85, and center dresser plate 90 may have a length of approximately two-inches to 72-inches, a width of ¼-inch to 12-inches, and a thickness of 1/32-inch to 6-inches. The wall brackets 30 and 35 and television brackets 100 and 105 may have a length of approximately 2-inches to 72-inches, a width of ¼-inch to 12-inches, and a thickness of 1/32-inch to 6-inches.

FIG. 1 is a front view of a television 200 on a dresser 300 connected by the device of the present invention, which is also mounted to a wall. With reference to FIG. 1, the present invention is shown from a front view, where dashed lines representing the hidden portions of the device that are obscured by the television and dresser. Specifically, FIG. 1 shows a pair of television brackets 100 and 105 and corresponding television mounting plates 120 and 125, respectively. In at least one embodiment of the present invention, television brackets 100 and 105 extend between the back of the television and the dresser. In another embodiment, additional television brackets may be attached between the exterior of the television and the dresser for additional stability, which may be desired for larger or heavier televisions. FIG. 1 also shows center dresser plate 90 and side plates 80 and 85 for mounting dresser mounts to the dresser, which may assist in supporting the wall brackets and the television brackets 100 and 105.

Figure 2:
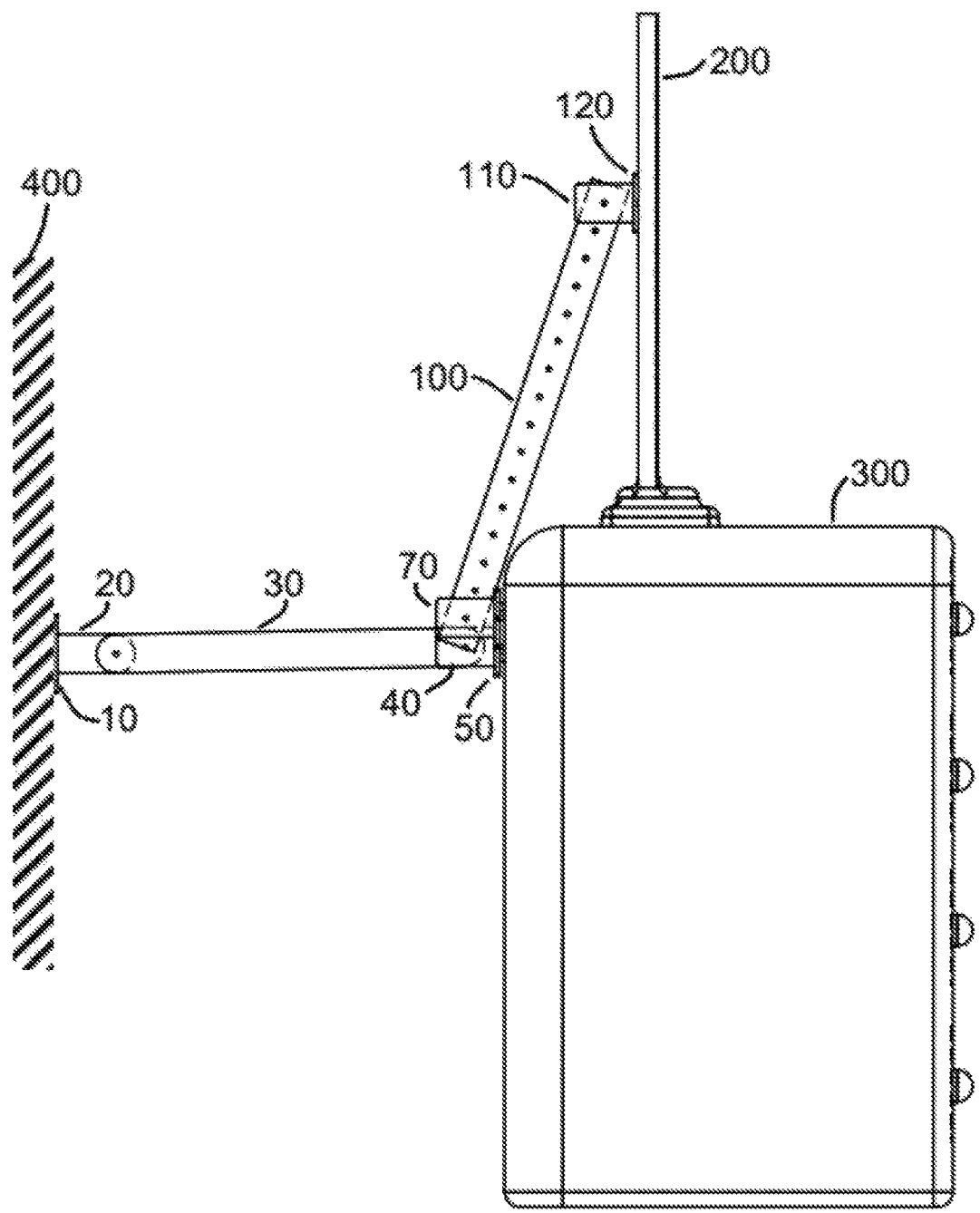
FIG. 2 is a left side view of the device of the present invention illustrating its connections between the wall and the dresser, and that dresser and the television in which at least one of the embodiments of this invention is implemented.

FIG. 2 is a side view of a television 200 on a dresser 300 connected by the device of the present invention, which is also mounted to a wall. In reference to FIG. 2, which is a view of the device from the left hand side, shows that television bracket 100 connects to the dresser mount 70 at one end and the television mount 110 at the other end. Television mount 110 connects to television mounting plate 120, which connects to the back of the television. In addition to stabilizing a television, the present invention may also stabilize three-dimensional televisions, 3D TVs, high-definition televisions, HDTV, three-dimensional high-definition televisions, 3D HDTV, televisions with integrated media or game units, flat-panel displays, flat-screen displays, computer monitors, monitors with integrated computers, all-in-one computer screens, electronic and non-electronic picture frames, laptops, notebooks, 2-in-1 computers, tablet computers, digital screens integrated with an appliance, and any present or future device that is capable of tipping over or falling off of a dresser or similar object.

In reference to FIG. 2, it is also shown that wall mount 20 has a wall mounting plate 10, which connects to a wall or other stationary surface 400 with at least one screw, key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism.

Figure 12:
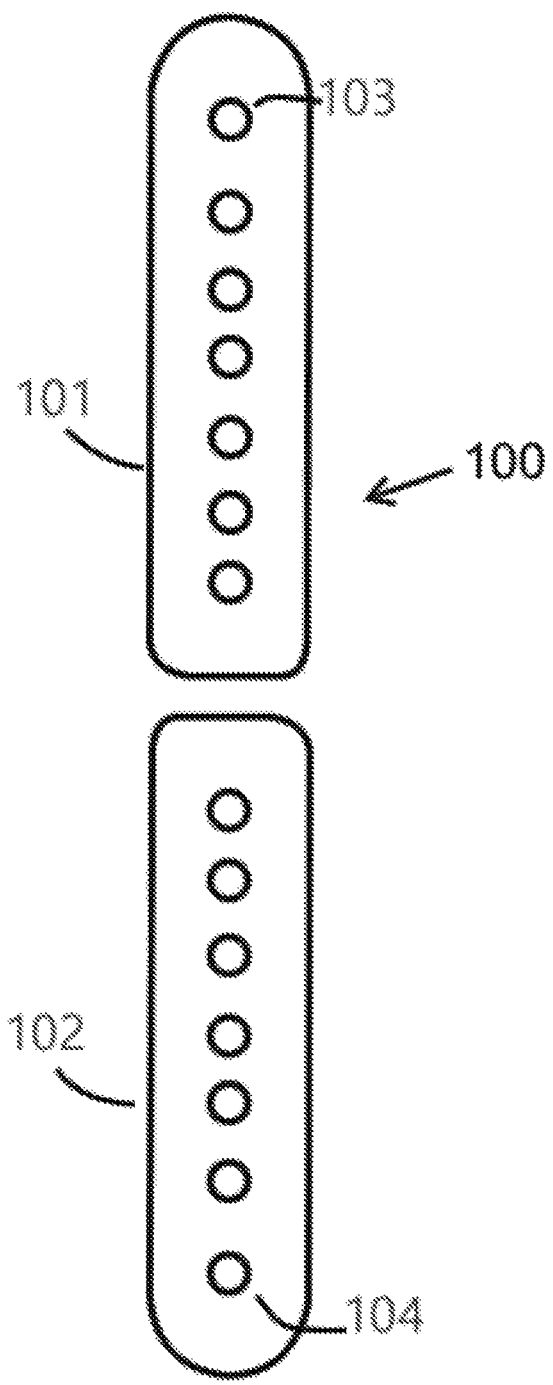
FIG. 12 is a left view of the left television bracket, which comprises an upper stabilizing arm and a lower stabilizing arm, of the present invention in which at least one of the embodiments of this invention is implemented.

Also as shown in FIG. 2, wall mount 20 connects to wall bracket 30, which connects to dresser mount 40. Dresser mount 40 has a dresser mounting plate 50 that connects to the dresser. In at least one embodiment, as shown in FIG. 2, wall bracket 30 is shown constructed of a single piece of material. In other embodiments, wall bracket 30 may be comprised of two pieces, similar to the television bracket 100, as shown in FIG. 12, with an upper stabilizing arm 101 and a lower stabilizing arm 102. One advantage of a two-piece wall bracket, similar to the television bracket shown in FIG. 12, is that it allows the dresser to be placed at a multitude of distances from the wall. Another advantage of a two-piece bracket is that the individual brackets can be configured to different lengths, so that the dresser may be secured to the wall at an angle. In at least one embodiment, the wall mounts and dresser mounts may be rotated from the position shown in the drawings before mounting. This may allow the brackets to be configured to different lengths, while securing the dresser to the wall at an angle.

Figure 3:
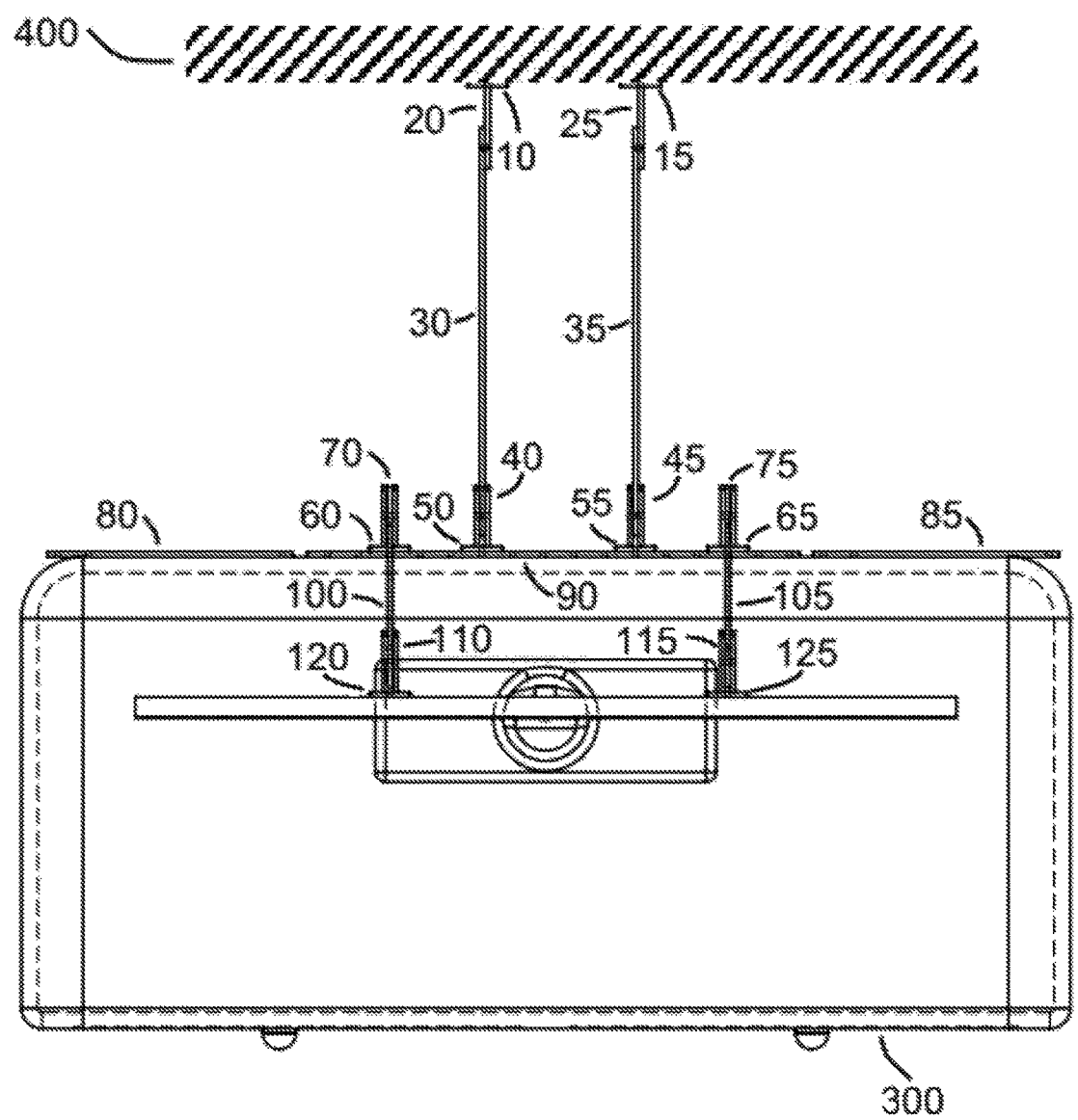
FIG. 3 is a top view of the device of the present invention illustrating its connections between the wall and the dresser, and that dresser and the television in which at least one of the embodiments of this invention is implemented.

FIG. 3 is a top view of a television 200 on a dresser 300 connected by the device of the present invention, which is also mounted to a wall. The top view of the device is shown in FIG. 3 provides further detail to the individual elements that were previously described. Specifically, FIG. 3 shows on the lower right hand side, television bracket 105, which connects to television mount 115. The television mounting plate 125 of television mount 115 connects to the back of the television. The opposite end of television bracket 105 connects to dresser mount 75 and its mounting plate 65. Dresser mounting plate 65 connects to center dresser plate 90, which connects to the back of a dresser. In this way, these connecting mounts and mounting plates form a stable connection between the television and the dresser to also prevent the television from moving.

On the upper right hand side of FIG. 3, wall mounting plate 15 of wall mount 25 connects to a wall or other stationary support 400. Wall bracket 35 connects to wall mount 25 and dresser mount 45. Dresser mount 45 has a mounting plate 55, which connects to center dresser plate 90, which connects to the back of a dresser.

On the lower left hand side of FIG. 3, television bracket 100 is shown, which connects to television mount 110. The television mounting plate 120 of television mount 110 connects to the back of the television. The opposite end of television bracket 100 connects to dresser mount 70 and its mounting plate 60. Dresser mounting plate 60 connects to center dresser plate 90, which connects to the back of a dresser. In this way, these connecting mounts and mounting plates form a stable connection between the television and the dresser to prevent the television from moving.

Also, as shown on the upper left hand side of FIG. 3, wall mounting plate 10 of wall mount 20 connects to a wall or other stationary support 400. Wall bracket 30 connects to wall mount 20 and dresser mount 40. Dresser mount 40 has a mounting plate 50, which connects to center dresser plate 90, which connects to the back of a dresser. Wall brackets 30 and 35 and their connecting mounts and mounting plates form a stable connection between a wall and a dresser. This stable connection prevents the dresser from moving. In an alternative embodiment, a single wall bracket may be used, rather than two wall brackets. If a single wall bracket is used, it may be connected at multiple locations along the wall to stabilize the dresser.

In addition, FIG. 3 shows additional side plates 80 and 85 that allow for the brackets and mounts to be spaced further apart, or for additional brackets and mounts to be installed. This arrangement also allows for the television to be mounted closer to the left or right side of the dresser.

In at least one embodiment, the dresser mounts 40, 45, 70, and 75 are attached to the dresser with a at least one screw, key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism. In an alternative embodiment either the center dresser plate 90 or the side plates 80 and 85 may be formed to create a slot, so that one or more of the dresser mounts 40, 45, 70, or 75 may be slid in from the top. Sliding the dresser mounts 40, 45, 70, and 75 in from the top allows the back of the dresser to be placed closer to the wall, since hardware would not have to be installed from behind the dresser.

Figure 4:
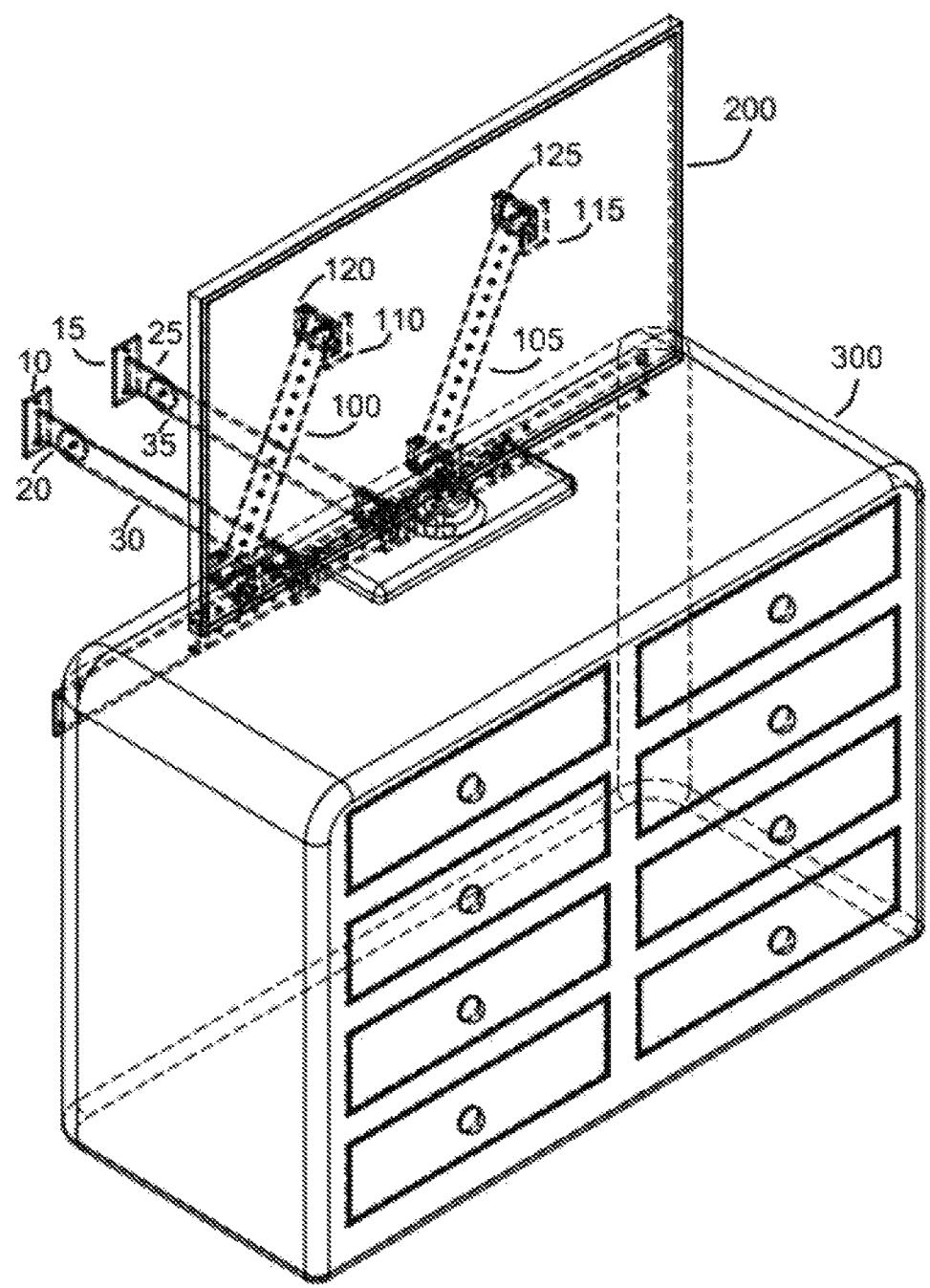
FIG. 4 is a perspective front view of the device of the present invention illustrating its connections to the television and dresser in which at least one of the embodiments of this invention is implemented.

FIG. 4 is a front left perspective view of a television 200 on a dresser 300 connected by the device of the present invention, which is also mounted to a wall. With reference to FIG. 4, the television bracket 105 on the right hand side connects to television mount 115, which connects to the television by way of television mounting plate 125. Similarly, television bracket 100 on the left hand side connects to television mount 110, which connects to the television by way of television mounting plate 120. Television brackets 100 and 105 are fixed at one end to the back exterior surface of the television opposite the screen, and at the other end to the dresser. In an alternative embodiment, a single television bracket may be used to stabilize the television to the dresser. Since the television typically has two holes on the back, the television bracket may connect to either of these holes. In at least one embodiment, a flat bar similar to the dresser plate with a plurality of holes along its length may be attached to the back of the television. This may increase the flexibility of where the television bracket may connect.

In at least one embodiment, a television bracket may connect to the television mount with a ring or a flexible device that allows the television to be mounted at an angle on the dresser. This may allow the television to be placed at a range of viewing angles. In addition, a two-piece wall bracket may allow the dresser plate to attach at various distances from the wall. Furthermore, this may allow the dresser mounts to be placed on top of the dresser as opposed to the back of the dresser. Thus, this may allow the dresser to be placed close to the wall, since the connections may be made from the top of the dresser. In at least one other embodiment, the dresser mounts may be directly screwed into the dresser without using the dresser plate.

Figure 28:
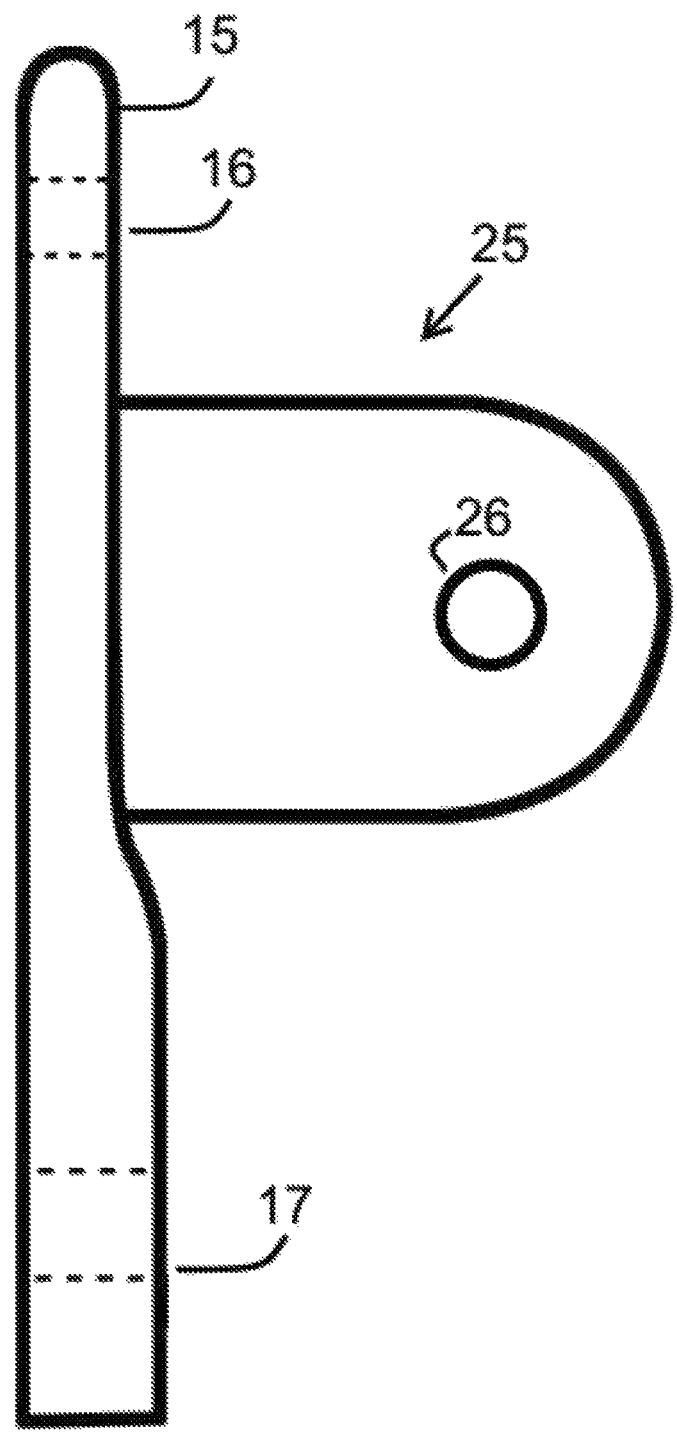
FIG. 28 is a left view of the right wall mount of the present invention in which at least one of the embodiments of this invention is implemented.

On right hand side of FIG. 4, wall mount 25 is shown with its wall mounting plate 15, which connects to a wall by at least one screw, key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism. Wall mount 25 connects to wall bracket 35, which connects to the dresser. Further detail of wall mount 25 is shown in FIG. 28, which shows an upper hole 16 and a lower hole 17 drilled in wall mounting plate 15 to allow for the passage of a screw or other fastener to connect wall mounting plate 15 to the wall.

On left hand side of FIG. 4, wall mount 20 is shown with its wall mounting plate 10, which connects to a wall by at least one screw, key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism. Wall mount 20 connects to wall bracket 30, which connects to the dresser.

Wall mounts 20 and 25 are designed to screw into wall studs to increase the strength of the connection. However, if it is not possible or practical to attach to the wall studs, or if the wall studs are difficult to locate, which may occur if the wall is of a lath and plaster construction, a wall plate, similar to the dresser plate, may be used. By connecting the wall plate to the wall in a multitude of locations, the strength of the attachment to the wall can be increased. The wall mounts 20 and 25 may then be connected anywhere along the length of the wall plate to allow the wall mounts to be connected in a multitude of locations.

Figure 21:
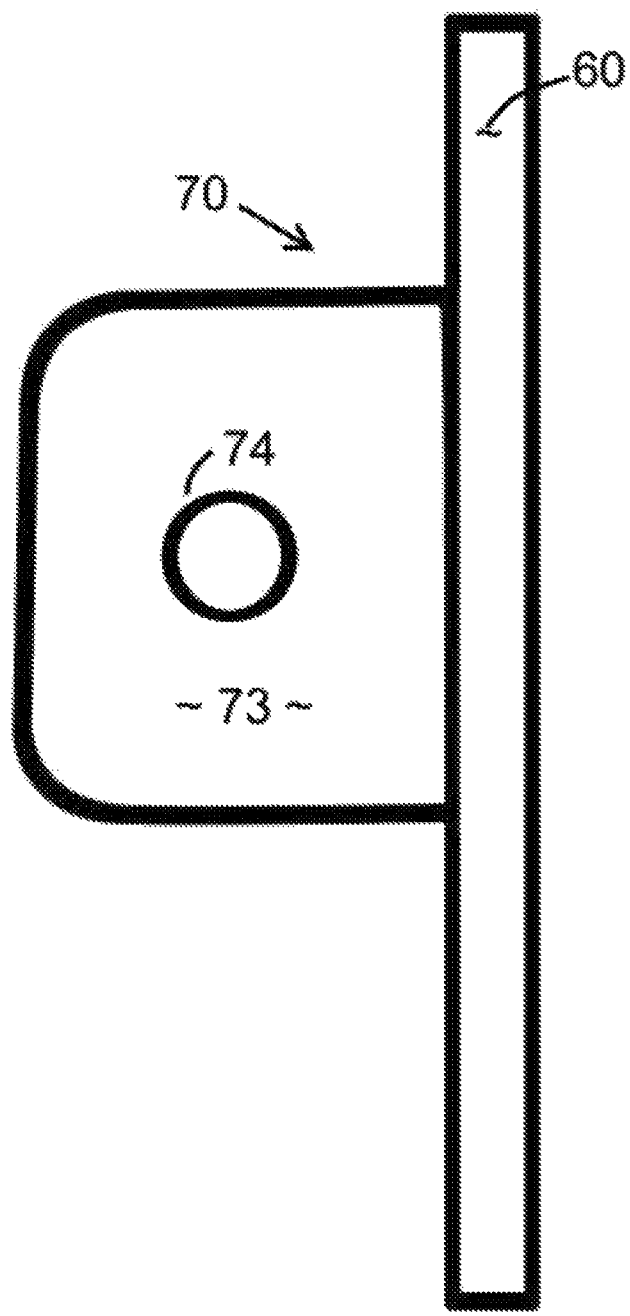
FIG. 21 is a left view of the dresser mount on the left (when viewed from the front), which connects to the left television bracket, of the device of the present invention in which at least one of the embodiments of this invention is implemented.
Figure 22:
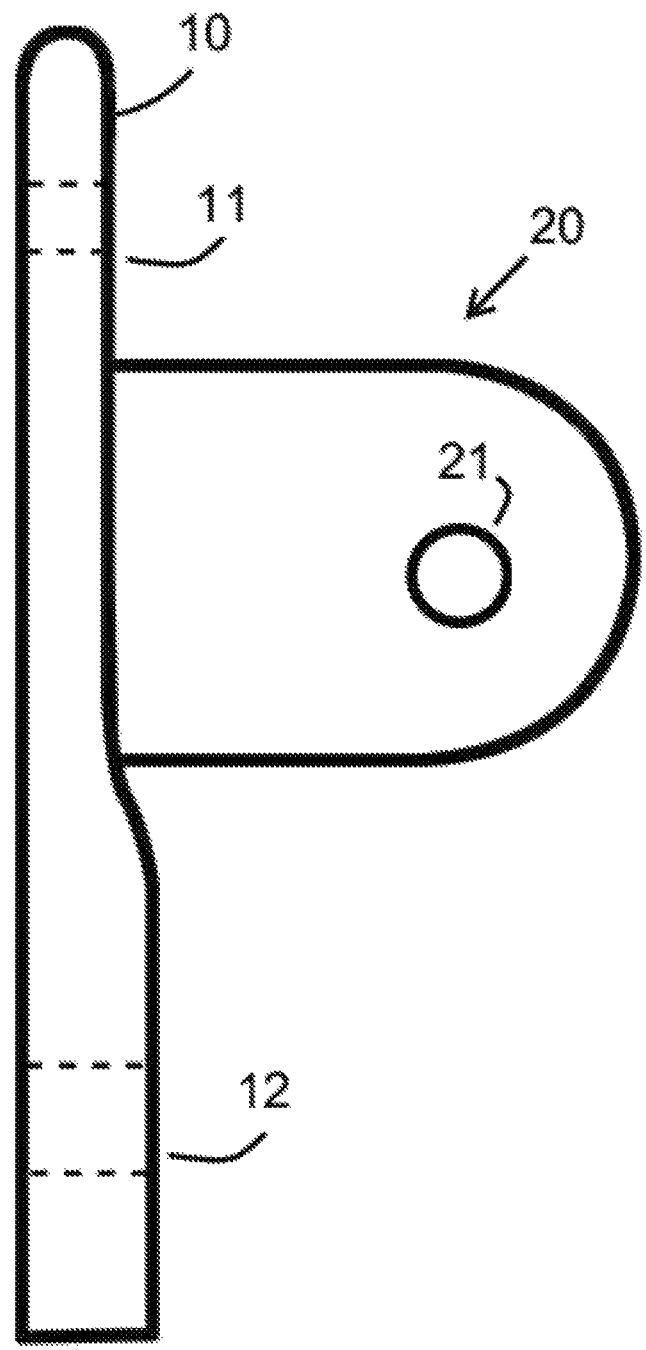
FIG. 22 is a left view of the left wall mount of the present invention in which at least one of the embodiments of this invention is implemented.

FIG. 22 shows wall mount 20 in further detail as a single piece of material that connects perpendicularly to wall mounting plate 10. Similarly, the embodiment shown in both FIG. 3 and FIG. 28 shows wall mount 25 as a single piece of material that connects perpendicularly to wall mounting plate 15. In an alternative embodiment, two pieces of material in parallel may connect perpendicularly to the wall mounting plate, similar to the television mount shown in FIG. 10 and FIG. 11, and the dresser mount shown in FIG. 20 and FIG. 21. One advantage of having two pieces of material in parallel extending perpendicularly from a wall mounting plate is that the corresponding wall bracket may be braced on both sides. This may help prevent the dresser from moving from side to side.

In at least one embodiment, the wall mounts 20 and 25, as shown in FIGS. 22 and 28, respectively, and their wall mounting plates 10 and 15, may be constructed of a flat piece of material connected perpendicularly to another relatively flat piece of material. In another embodiment, the wall mounts and their mounting plates may be constructed by bending a flat piece of metal or other suitable material at approximately a 90-degree angle to form a structure similar to an L-bracket, where one leg may be mounted flush against a wall, and the other leg may extend towards the dresser.

In yet another embodiment, similar to the configuration shown in FIG. 4, the wall mounts 20 and 25 and their wall mounting plates 10 and 15 may be combined with the wall brackets 30 and 35. In this configuration a long flat piece of metal or other suitable material could be bend at one end at approximately a 90-degree angle. This would form a small tab, similar to the short leg of an L-bracket, which may be mounted flush against a wall or other stationary surface. The long leg of the L-bracket would take the place of the wall bracket, which would extend towards the dresser and connect with a dresser mount. Constructing both the wall mounts, their wall mounting plates, and wall brackets from a single piece of material may reduce the amount of material needed to create the device, which may reduce its cost. It may also make installation faster, since the wall mounts would not need to be connected to the wall brackets during installation.

In at least one embodiment, similar to the configuration shown in FIG. 3, the wall brackets 30 and 35 and television brackets 100 and 105 may have a cross-sectional shape that is rectangular. In other embodiments, the wall brackets 30 and 35 and television brackets 100 and 105 may have a cross-sectional area that is circular, non-circular, oval, triangular, square, or of another shape. The wall brackets 30 and 35 and television brackets 100 and 105 may be constructed of a material that is made of plastic, metal, glass, wood, or another suitable material. Similarly, the wall mounts 20 and 25; dresser mounts 40, 45, 70, and 75; dresser mounting plates 50, 55, 60, and 65; left side dresser plate 80, right side dresser plate 85, and center dresser plate 90; television mounts 110 and 115, and television mounting plates 120 and 125 may all be constructed of a material that is made of plastic, metal, glass, wood, or another suitable material.

Figure 10:
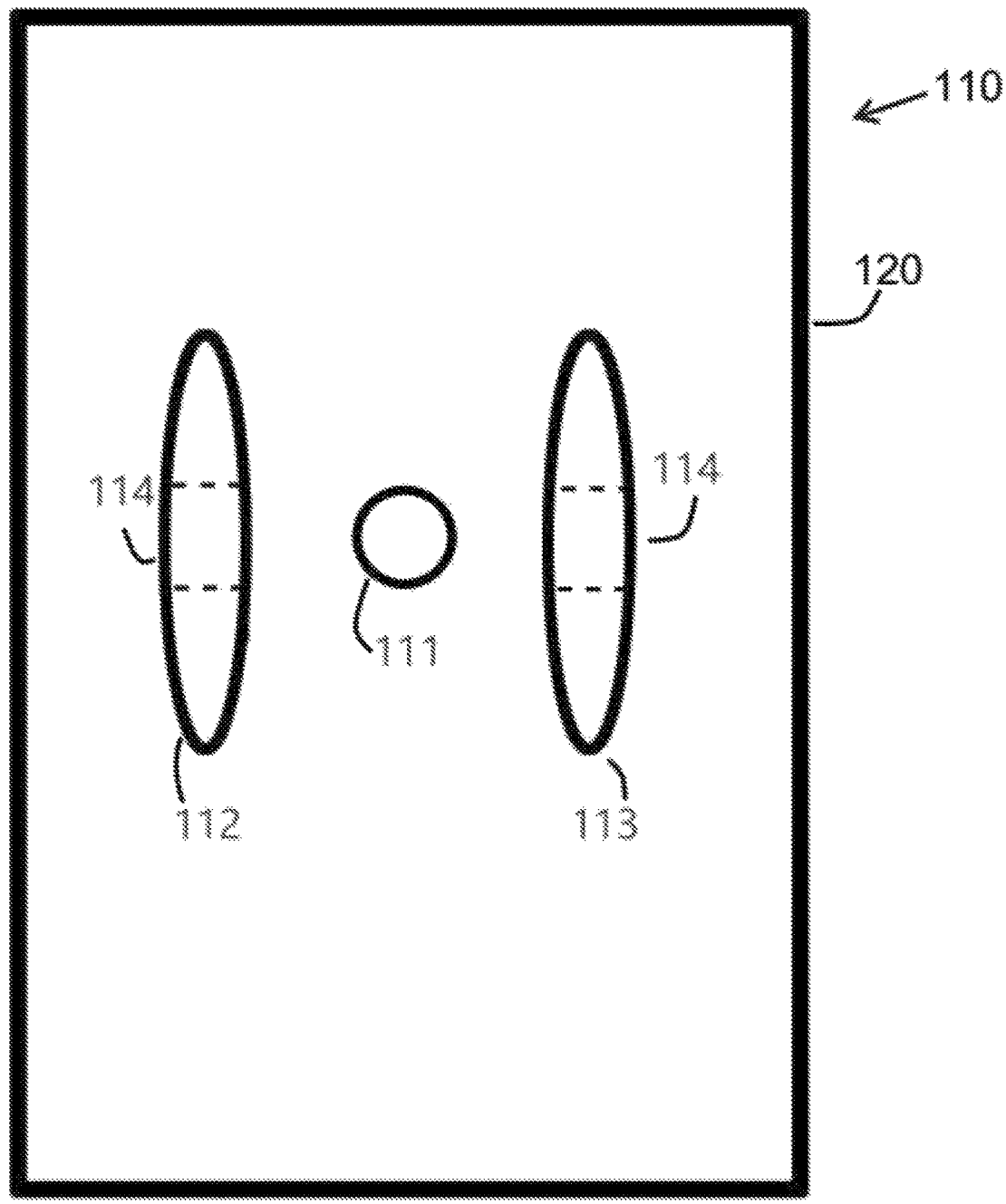
FIG. 10 is a back view of the television mount on the left (when viewed from the front) of the device of the present invention in which at least one of the embodiments of this invention is implemented.
Figure 11:
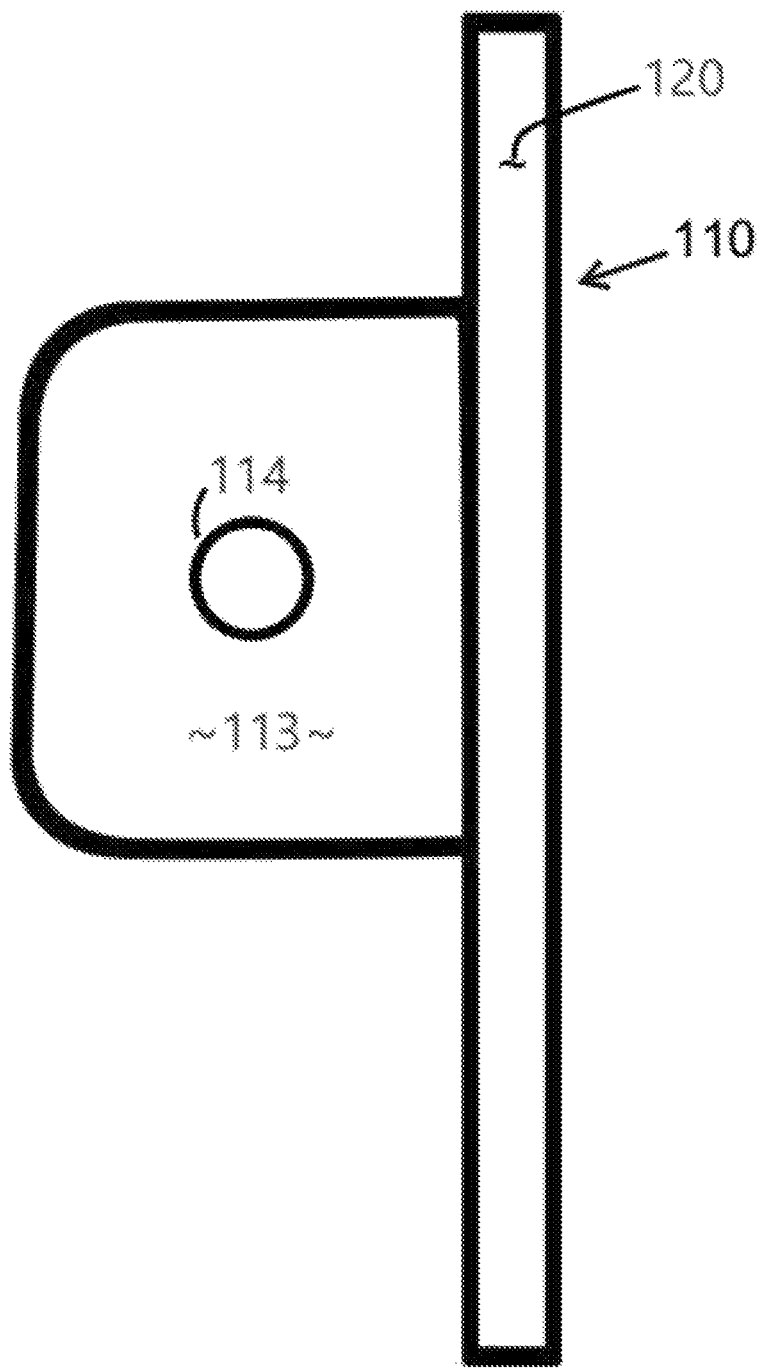
FIG. 11 is a left view of the upper left television mount of the present invention in which at least one of the embodiments of this invention is implemented.

In at least one embodiment, the television mount 110, which is shown from a front view in FIG. 10 and a side view in FIG. 1, may be constructed of two parallel pieces of flat material 112 and 113 that are connected perpendicularly to a television mounting plate 120, as shown in 30o FIGS. 10 and 11, which may also be constructed of a relatively flat piece of material.

Figure 15:
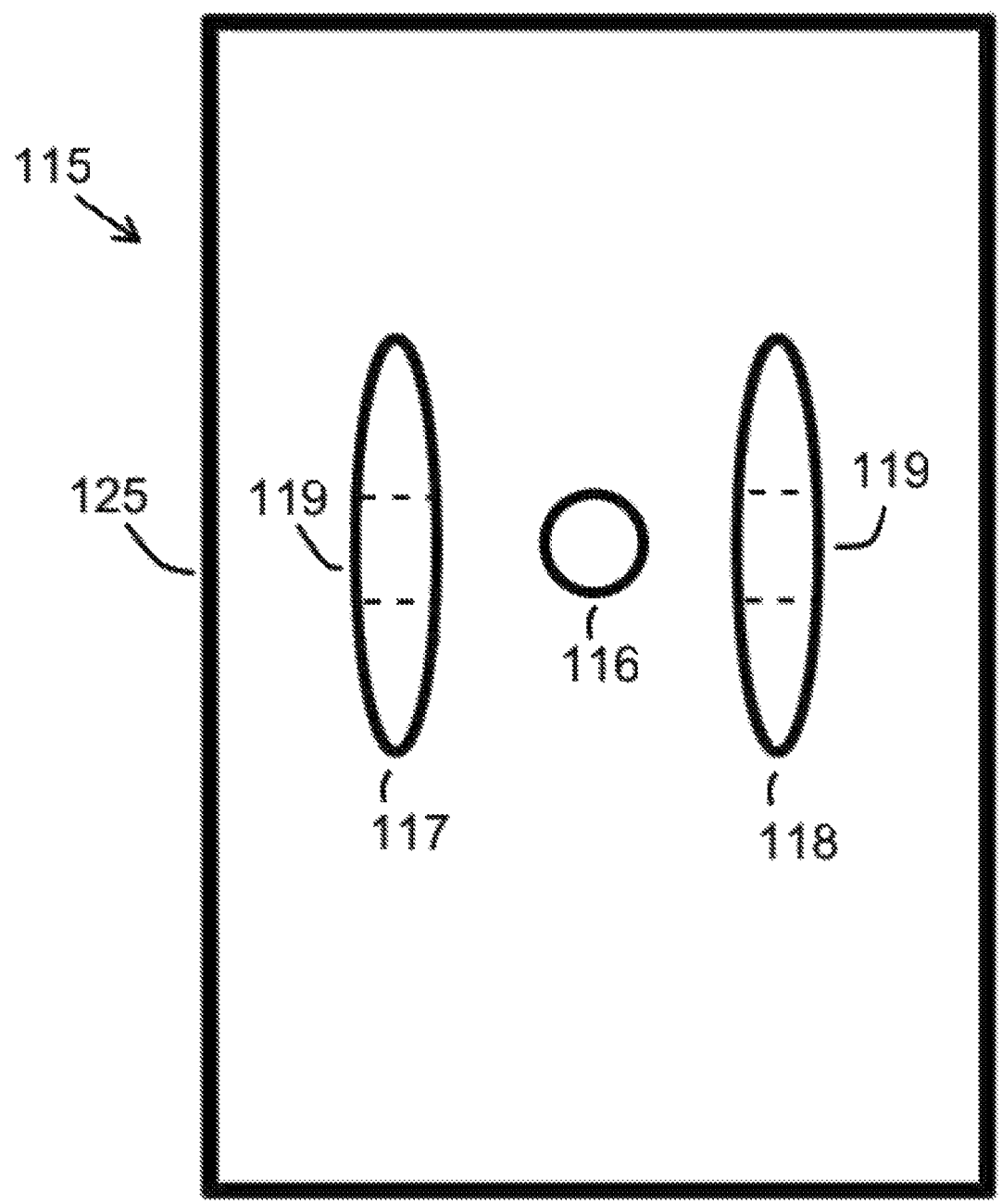
FIG. 15 is a back view of the television mount on the right (when viewed from the front) of the device of the present invention in which at least one of the embodiments of this invention is implemented.
Figure 16:
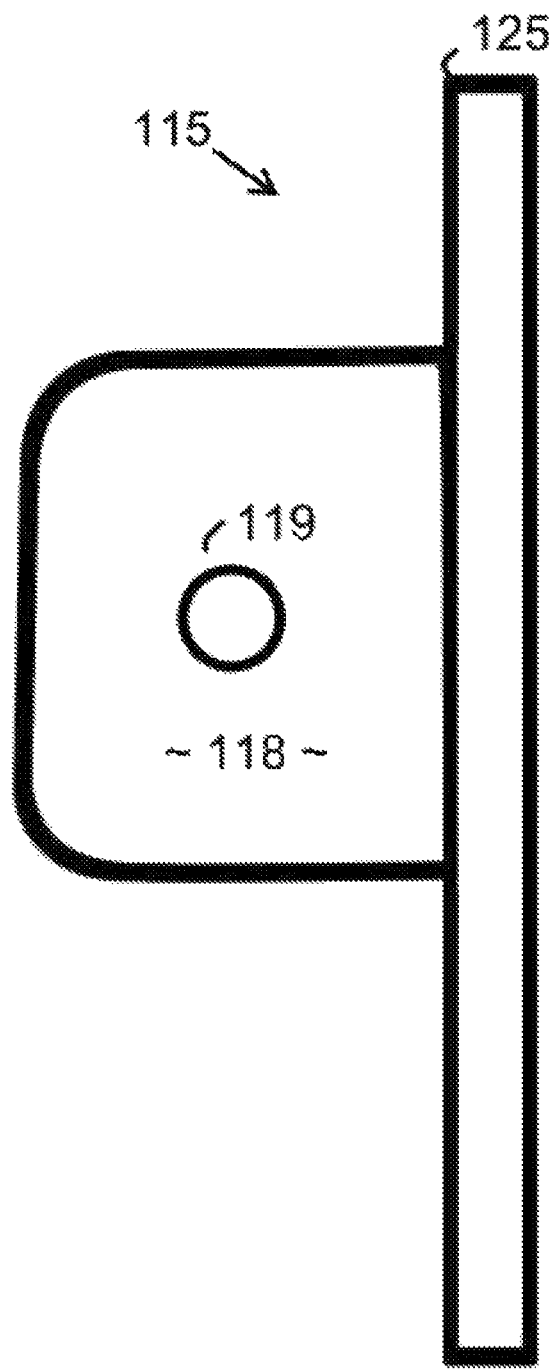
FIG. 16 a left view of the upper right television mount of the present invention in which at least one of the embodiments of this invention is implemented.

Similarly, in at least one embodiment, television mount 115, which is shown from a front view in FIG. 15 and a side view in FIG. 16, may be constructed of two parallel pieces of flat material 117 and 118 that are connected perpendicularly to a television mounting plate 125, which may also be constructed of a relatively flat piece of material.

Furthermore, when the wall brackets 30 and 35 and television brackets 100 and 105 are composed of two pieces, one can have a slightly smaller cross-sectional area, so that they may connect with the smaller diameter member being inserted into the larger diameter member that has a hollow interior. By allowing one component to slide into another, the length of the brackets may be adjusted.

Moreover, when the wall brackets 30 and 35 and television brackets 100 and 105 are composed of two pieces with a circular cross-sectional area, one end can have a male screw thread on its outer diameter similar to that of a bolt, while the other end can have a female screw thread on its inner diameter similar to that of a nut. This will allow the end with the male thread to screw into the end with the female thread. In this way, the length of either the wall brackets or television brackets may be adjusted to the desired length.

In at least one embodiment, the wall brackets 30 and 35 and television brackets 100 and 105 and their corresponding mounts can be coupled together with at least one fastener, such as a screw, key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism. The fastener would intersect both the primary hole in the bracket and the corresponding hole in the mount. In an alternative embodiment, a shackle or shank of a padlock may also be used in place of the fastener. This may allow the television to be locked to the device to deter theft. This may be especially useful if the device is used to secure a television in a public place.

Figure 24:
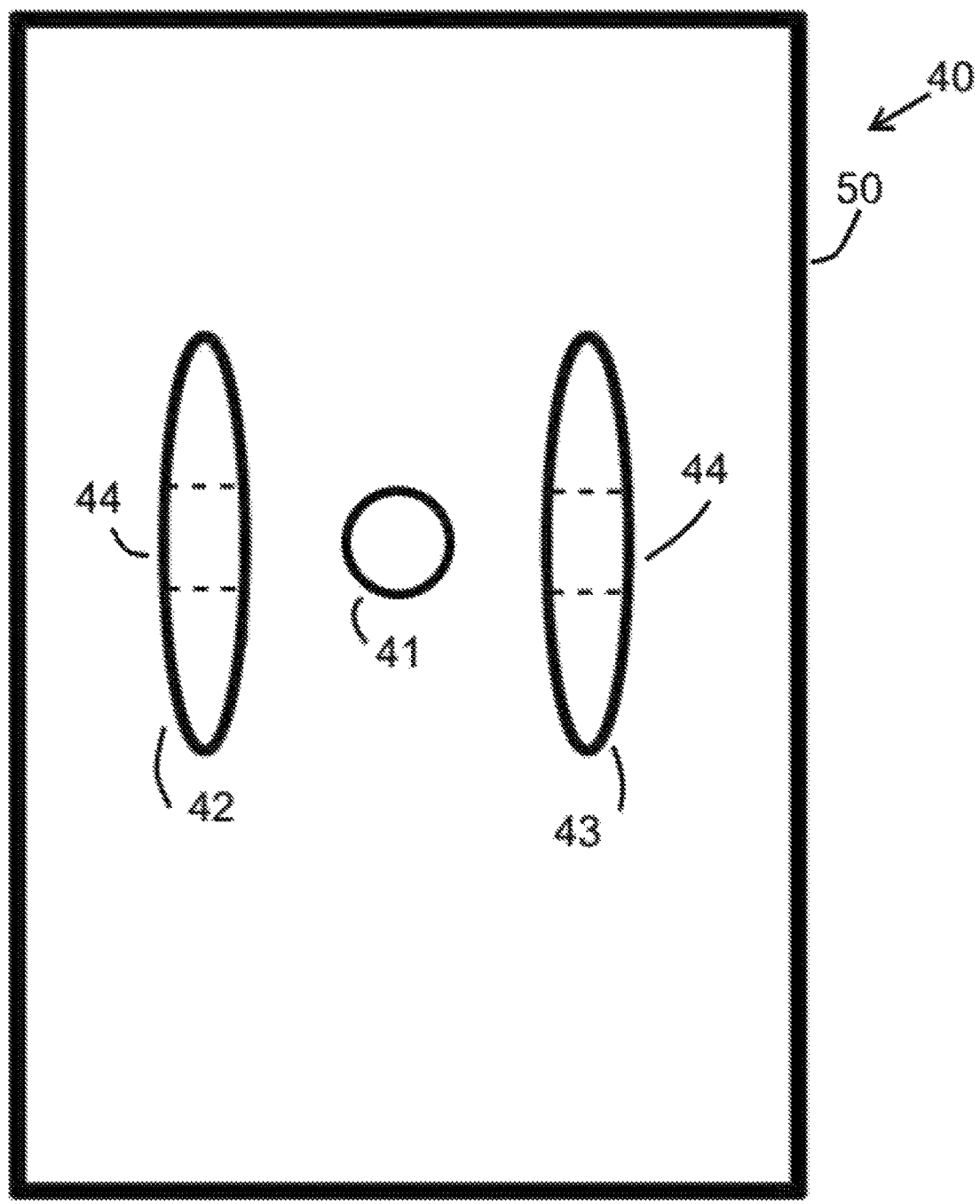
FIG. 24 is a back view of the dresser mount on the left (when viewed from the front), which connects to the left wall bracket, of the device of the present invention in which at least one of the embodiments of this invention is implemented.
Figure 25:
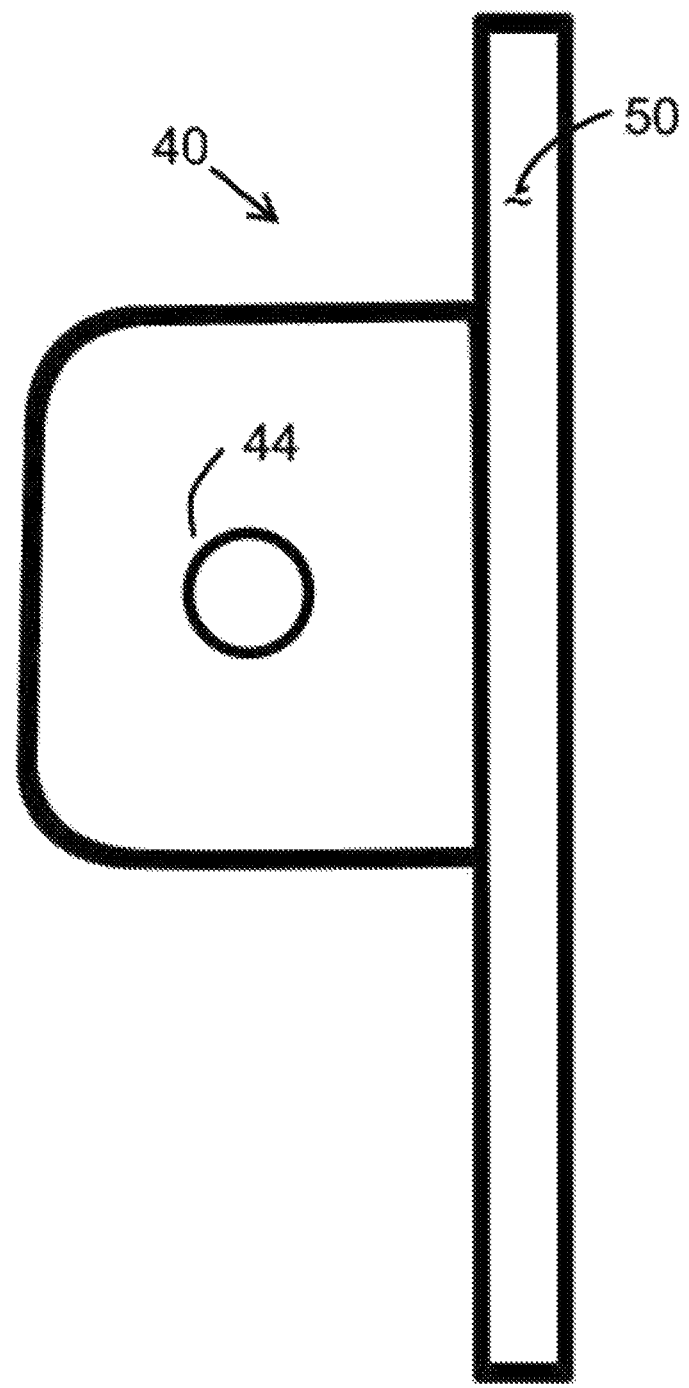
FIG. 25 is a left view of the dresser mount on the left (when viewed from the front), which connects to the left wall bracket, of the device of the present invention in which at least one of the embodiments of this invention is implemented.

Dresser mount 40, which is shown from a front view in FIG. 24 and a side view in FIG. 25, may be constructed of two parallel pieces of flat material 42 and 43 that may be connected perpendicularly to a relatively flat piece of material that serves as a dresser mounting plate 50.

Figure 5:
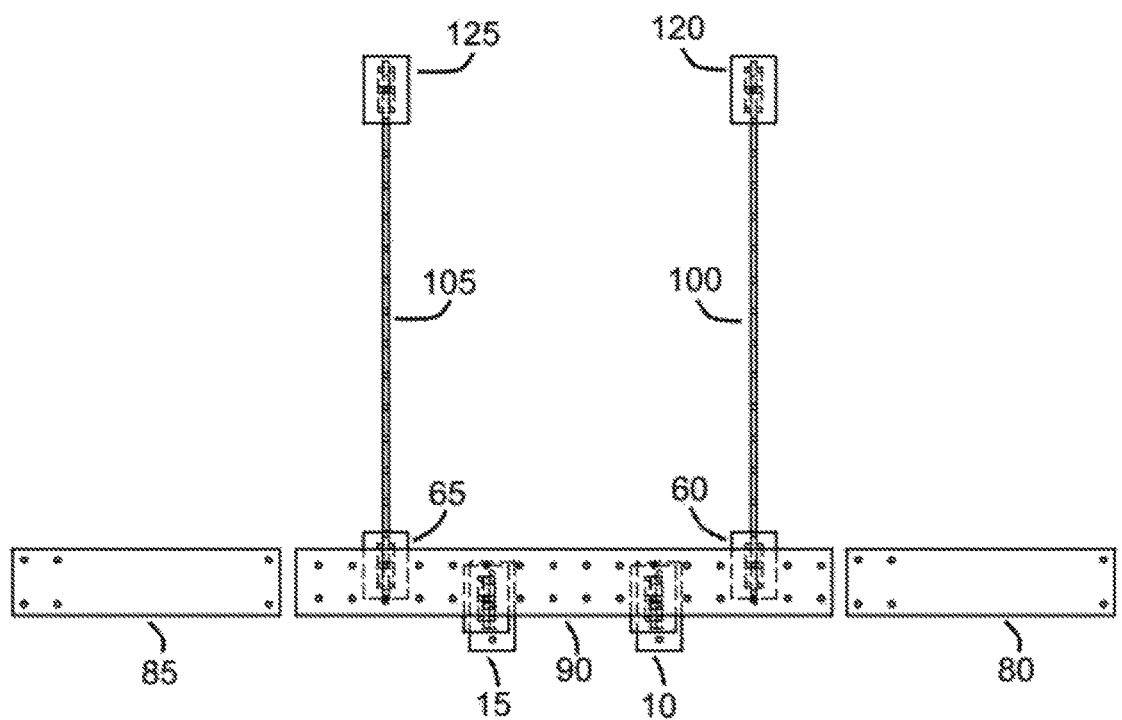
FIG. 5 is a back view of the device of the present invention without the television and dresser in which at least one of the embodiments of this invention is implemented.
Figure 7:
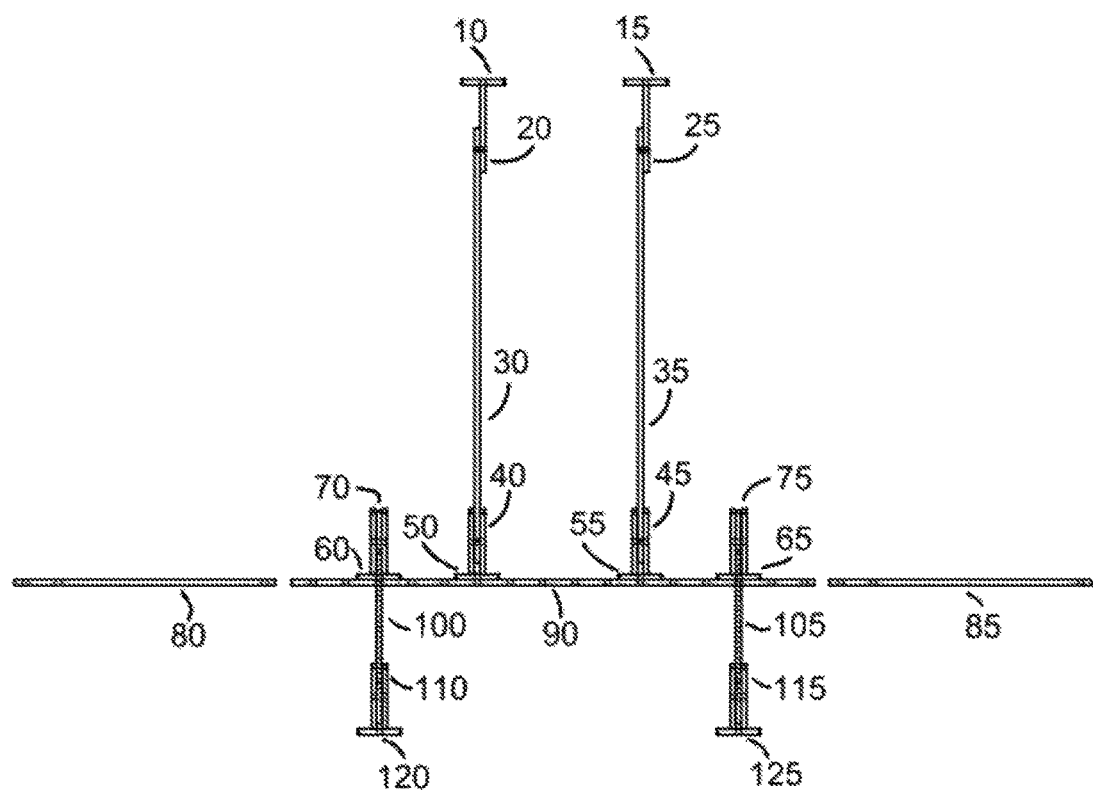
FIG. 7 is a top view of the device of the present invention without the television and dresser in which at least one of the embodiments of this invention is implemented.

FIG. 5 shows the device from the back view of the dresser without the television and dresser shown. On the right hand side, television bracket 100 connects to mounting plate 120. As shown in FIG. 5, the other end of television bracket 100 connects to mounting plate 60. Mounting plate 60 connects to television mount 70, as shown in FIG. 7. Also, as shown in FIG. 7, television mount 70 connects to center dresser plate 90.

FIG. 5 also shows that on the left hand side, television bracket 105 connects to mounting plate 125. As shown in FIG. 7, mounting plate 125 connects to television mount 115. Also as shown in FIG. 5, the other end of television bracket 105 connects to mounting plate 65. As shown in FIG. 7, mounting plate 65 connects to television mount 75.

In addition, as shown in FIG. 5, television mounting plate 60 and 65 connects to center dresser plate 90. Furthermore, FIG. 5 shows additional side plates 80 and 85, which allow for a larger spacing between either the television brackets or the wall brackets. In at least one embodiment, side plates 80 and 85 that allow for additional television brackets or wall brackets to be used. Moreover, FIG. 5 shows wall mounting plates 10 and 15, which are further illustrated in FIGS. 6 and 7.

Figure 6:
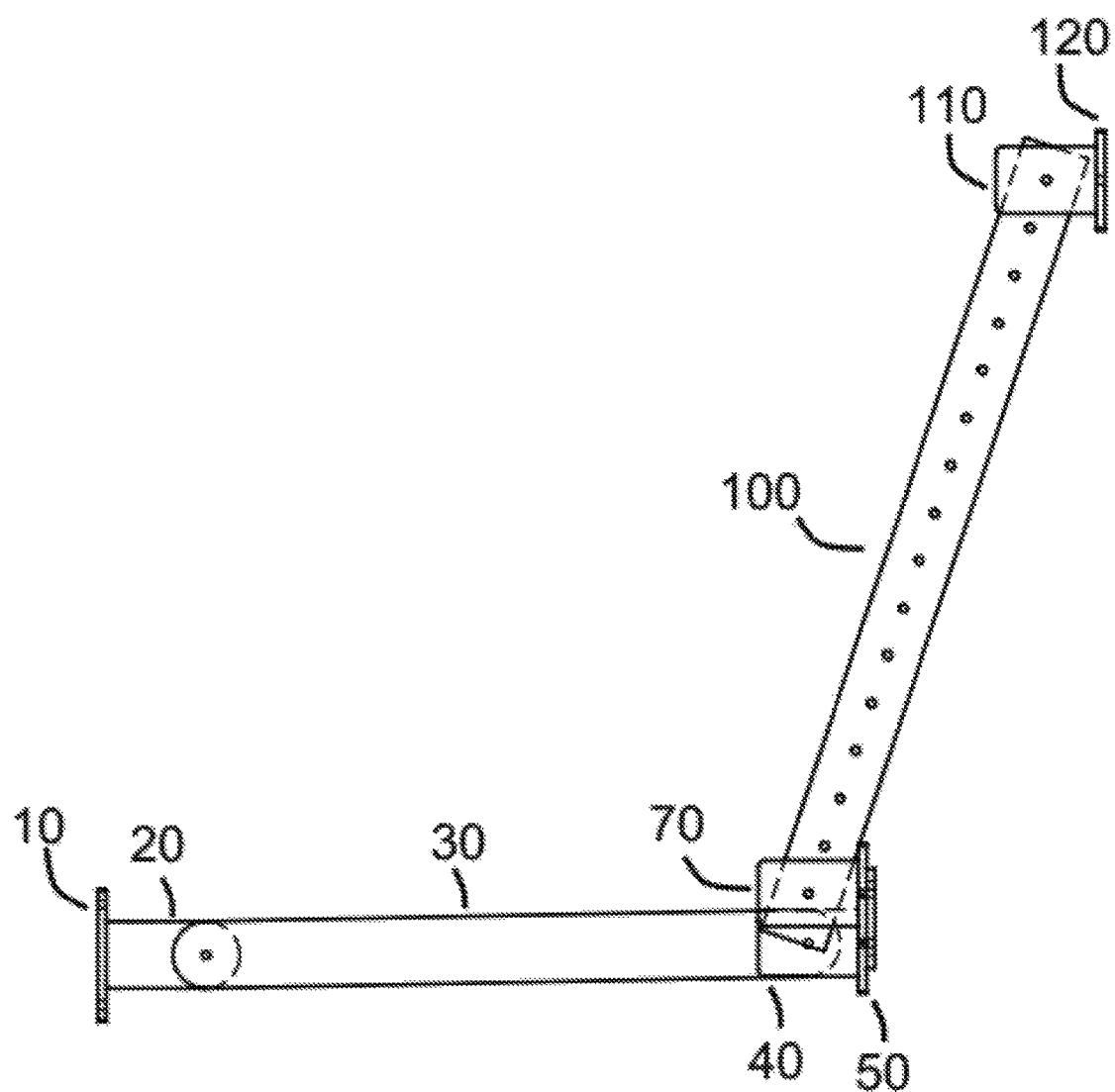
FIG. 6 is a left side view of the device of the present invention without the television and dresser in which at least one of the embodiments of this invention is implemented.

FIG. 6 is similar to FIG. 2 in that it shows the device from the left hand side, but without the dresser and television. On the far left, wall mounting plate 10 is connected to wall mount 20, which connects to wall bracket 30. Wall bracket 30 connects to dresser mount 40, which connects to dresser mounting plate 50. On the far right, at one end, television bracket 100 connects to television mount 110, which has a mounting plate 120. At the other end, television bracket 100 connects to dresser mount 70.

FIG. 7 is similar to FIG. 3, except that the dresser and television are not shown. On the top right hand side, mounting plate 15 connects to wall mount 25, which connects to wall bracket 35. Wall bracket 35 also connects to dresser mount 45 that is connected to mounting plate 55, which connects to center dresser plate 90. It can also be seen that at one end television bracket 105 connects to television mount 115. At the other end, it can be seen that television bracket 105 connects to dresser mount 75.

Similarly, on the left hand side of FIG. 7, wall mounting plate 10 is shown, which connects to wall mount 20. Wall mount 20 connects to wall bracket 30, which connects to dresser mount 40. Dresser mount 40 connects to mounting plate 50, which connects to center dresser plate 90. It can also be seen that at one end television bracket 100 connects to television mount 110, which connects to television mounting plate 120. At the other end, it can be seen that television bracket 100 connects to dresser mount 70, which connects to dresser mounting plate 60.

Figure 20:
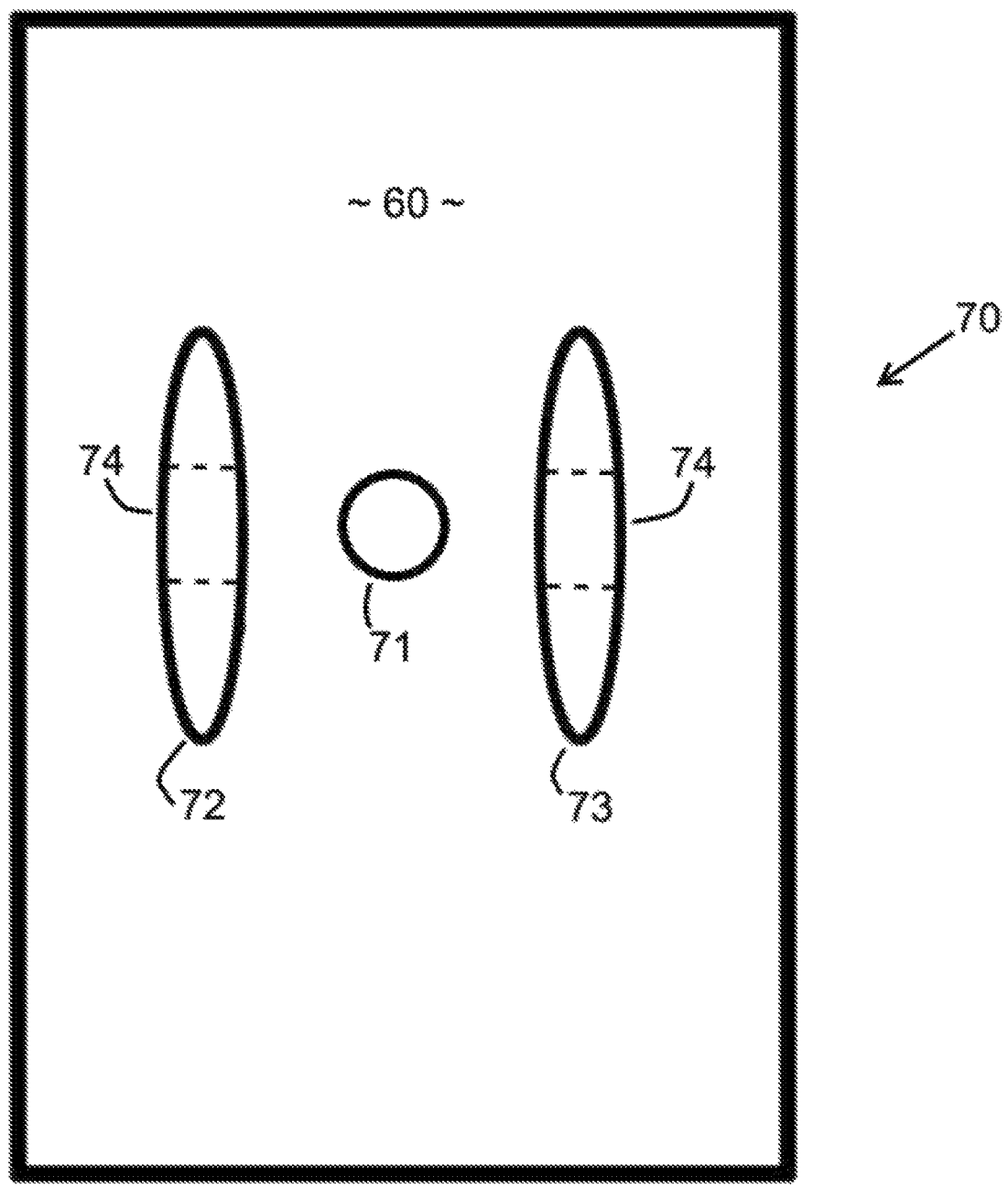
FIG. 20 is a back view of the dresser mount on the left (when viewed from the front), which connects to the left television bracket, of the device of the present invention in which at least one of the embodiments of this invention is implemented.

Dresser mount 70 as shown in FIGS. 20 and 21, which is shown from a front view in FIG. 20 and a side view in FIG. 21, may be constructed of two parallel pieces of flat material 72 and 73 that may be connected perpendicularly to a relatively flat piece of material that serves as their dresser mounting plates 60 as shown in FIGS. 20 and 21. As shown in FIG. 20, dresser mount 70 comprises a mounting hole 71, which allows it to attach to center dresser plate 90. A screw or other connecting device traverses hole 74, which allows dresser mount 70 to connect to television bracket 100, as shown in FIG. 12.

Figure 8:
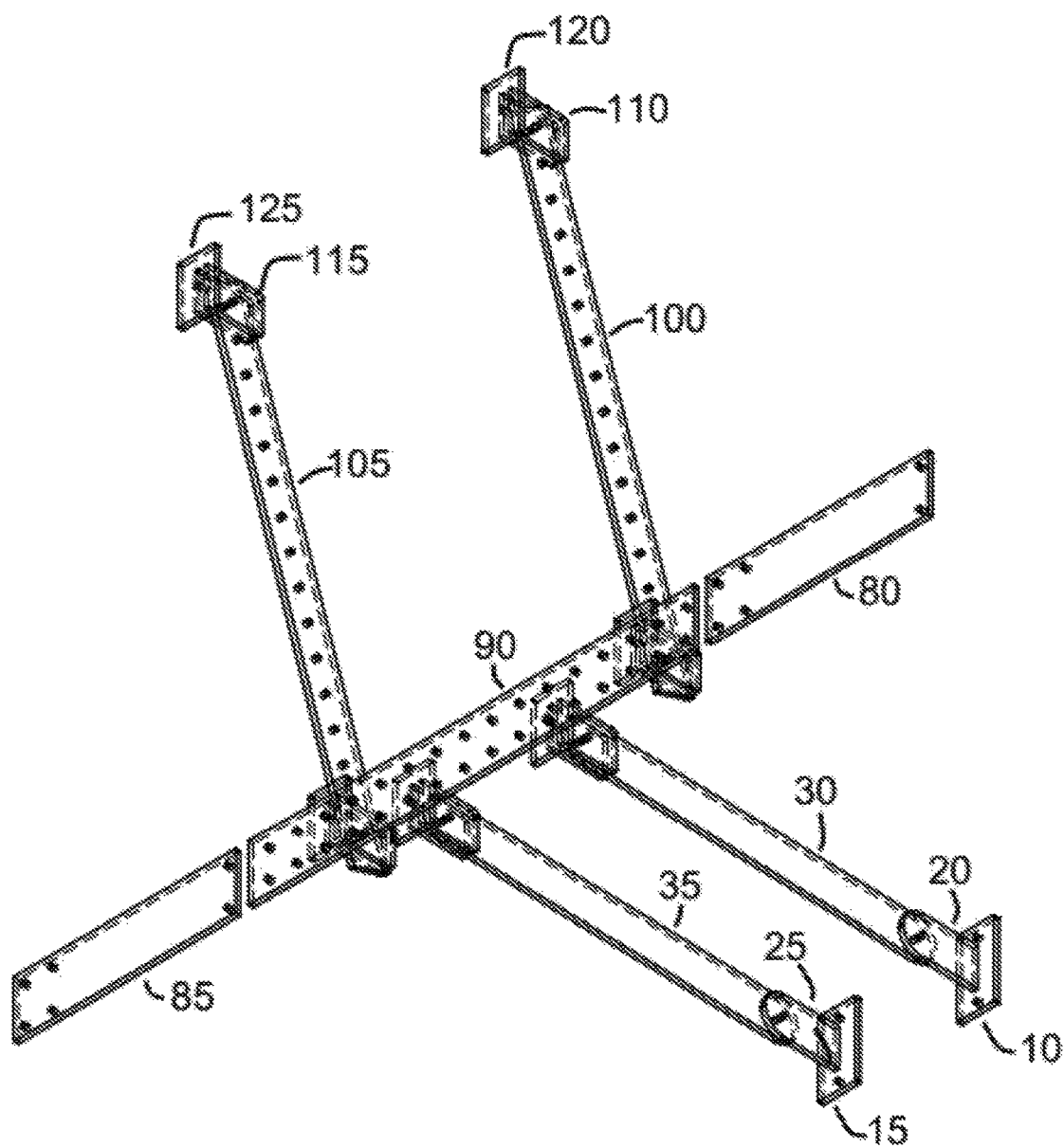
FIG. 8 is an isometric back view of the device of the present invention without the television and dresser in which at least one of the embodiments of this invention is implemented.

With reference to FIG. 8, a perspective back view of the device is shown. Specifically, it can be seen that wall mounting plate 10 connects to wall mount 20, which connects to wall bracket 30. Similarly, it can also be seen that mounting plate 15 connects to wall mount 25, which connects to wall bracket 35. It can also be seen that television bracket 100 connects to television mount 110, which connects to television mounting plate 120. Similarly, it can be seen that television bracket 105 connects to television mount 115, which connects to television mounting plate 125. FIG. 8 also shows center dresser plate 90 and additional side plates 80 and 85.

Figure 9:
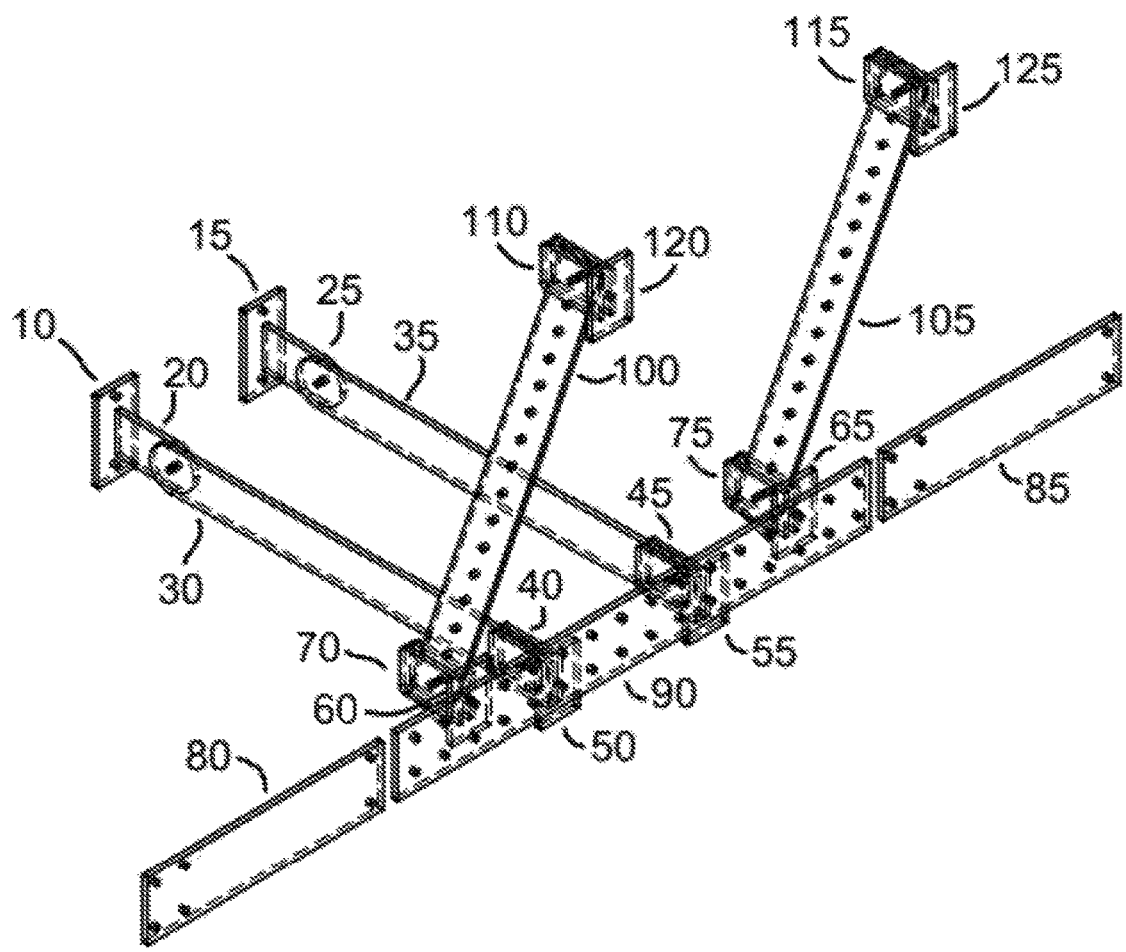
FIG. 9 is an isometric front view of the device of the present invention without the television and dresser in which at least one of the embodiments of this invention is implemented.

FIG. 9 is similar to FIG. 4, but is shown without the dresser and television. Thus, it can be seen on the left hand side that wall mounting plate 10 connects to wall mount 20, which connects to wall bracket 30. Wall bracket 30 also connects to dresser mount 40 that is connected to mounting plate 50, which connects to center dresser plate 90. Also, FIG. 9 shows on the left hand side that television bracket 100 connects to television mount 110, which connects to television mounting plate 120. Television bracket 100 also connects to dresser mount 70 that is connected to mounting plate 60, which connects to center dresser plate 90.

Similarly, it can be seen on the right hand side that mounting plate 15 connects to wall mount 25, which connects to wall bracket 35. Wall bracket 35 also connects to dresser mount 45 that is connected to mounting plate 55, which connects to center dresser plate 90. Similarly, it can be seen on the right hand side that television bracket 105 connects to television mount 115, which connects to television mounting plate 125. Television bracket 105 also connects to dresser mount 75 that is connected to mounting plate 65, which connects to center dresser plate 90.

In addition, as shown in FIG. 9, the center dresser plate 90 provides a mountable surface for the plurality of dresser mounts. Also, shown is a left side dresser plate 80 and a right side dresser plate 85 that surround the center dresser plate 90. In at least one embodiment, the left side dresser plate 80, the right side dresser plate 85, and the center dresser plate 90 comprise a rectangular cross-sectional shape. In an alternative embodiment, the television brackets and wall brackets may have a cross-sectional area that is circular, non-circular, oval, triangular, square, or another cross-sectional area. The left side dresser plate 80 and the right side dresser plate 85 comprises approximately the same size and dimensions. The center dresser plate 90 may have a longer length than that on the left side dresser plate 80 and right side dresser plate 85.

As shown in FIG. 9, dresser mounts 70 and 75 may be secured either to the center dresser plate 90, the left side dresser plate 80, the right side dresser plate 85, or directly to the dresser via a plurality of holes. Each of the plurality of holes may accommodate the engagement of a screw or another type of connection that may be aligned with the holes of the center dresser plate 90. In an alternative embodiment, the type of connection may also be a key, pin, peg, rivet, cotter pin, nail, spike, bolt, stud, staple, boss, clamp, clip, dowel, stake, hook, anchor, tie, ring, band, crimp, wedge, adhesive, shackle or shank of a padlock, or other connecting mechanism. In at least one embodiment, the center dresser plate 90 comprises holes that correspond to each of the corners of mounting plate 90. Each of these holes engage with a plurality of screws or another type of connection which fasten the center dresser plate 90 to the dresser. Similarly, the left side dresser plate 80 and the right side dresser plate 85 comprise one or more holes near the corresponding upper and lower corners. Each of these holes engage with a plurality of screws or another type of connection that fasten the plate to the dresser.

As shown in FIG. 10, television mount 110 is comprised of the left arm 112 and the right arm 113. Television mounting plate 120 comprises a rectangular cross-sectional shape with at least one mounting hole 111, which allows it to be secured to the back of the television console on the left side with a fastener. The mounting hole 111 provides a passage for a screw or comparable fastener to attach television mounting plate 120 to the television. Also, as shown in FIG. 10, hole 114 traverses both the left arm 112 and the right arm 113 of mount 110.

As shown in FIG. 11, which is a left side view of television mount 110, the right arm 113 is shown protruding from the television mounting plate 120. FIG. 11 also shows traversing hole 114, which aligns with the hole through both the left arm 112 and the right arm 113 as shown in FIG. 10.

Figure 23:
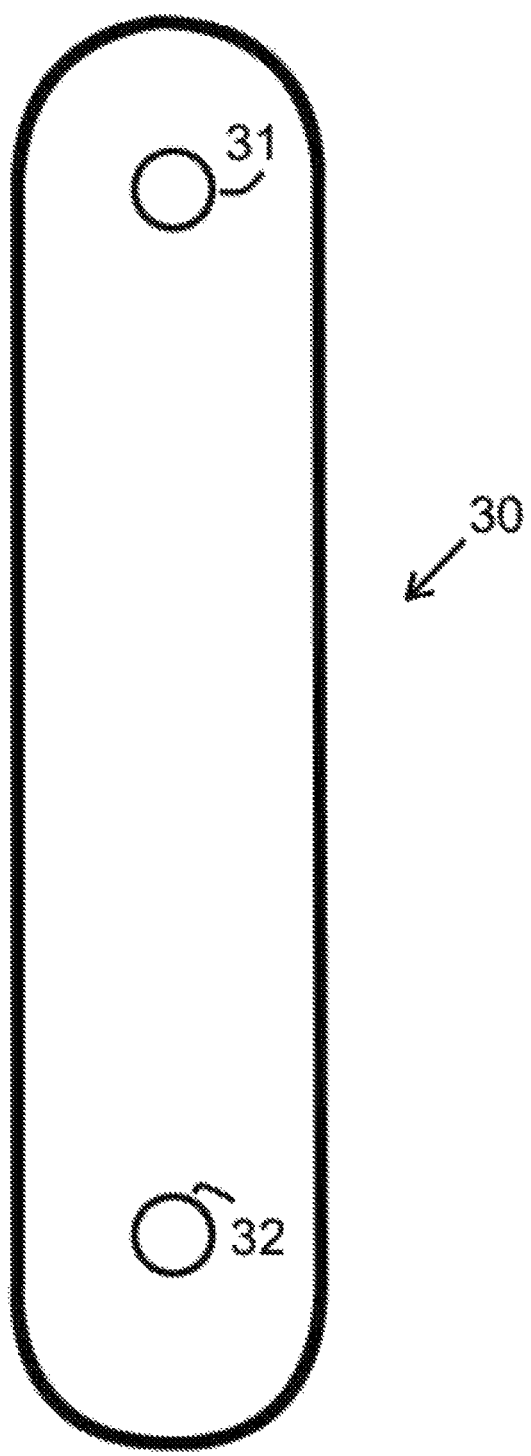
FIG. 23 is a left view of the left wall bracket of the present invention in which at least one of the embodiments of this invention is implemented.

As shown in FIG. 12, television bracket 100 in at least one embodiment may be comprised of an upper stabilizing arm 101 and a lower stabilizing arm 102. Upper stabilizing arm 101 comprise a primary hole 103 and a plurality of interlocking holes. The plurality of interlocking holes of the upper stabilizing arm 101 allows a television to be positioned at various lengths from the back edge of the dresser. In at least one embodiment, similar to wall bracket 30, as shown in FIG. 23, television bracket 100 may be constructed of a single piece of material. Some advantages of using a one-piece television bracket, includes that it may be manufactured with less material and that it may be installed in less time.

Figure 13:
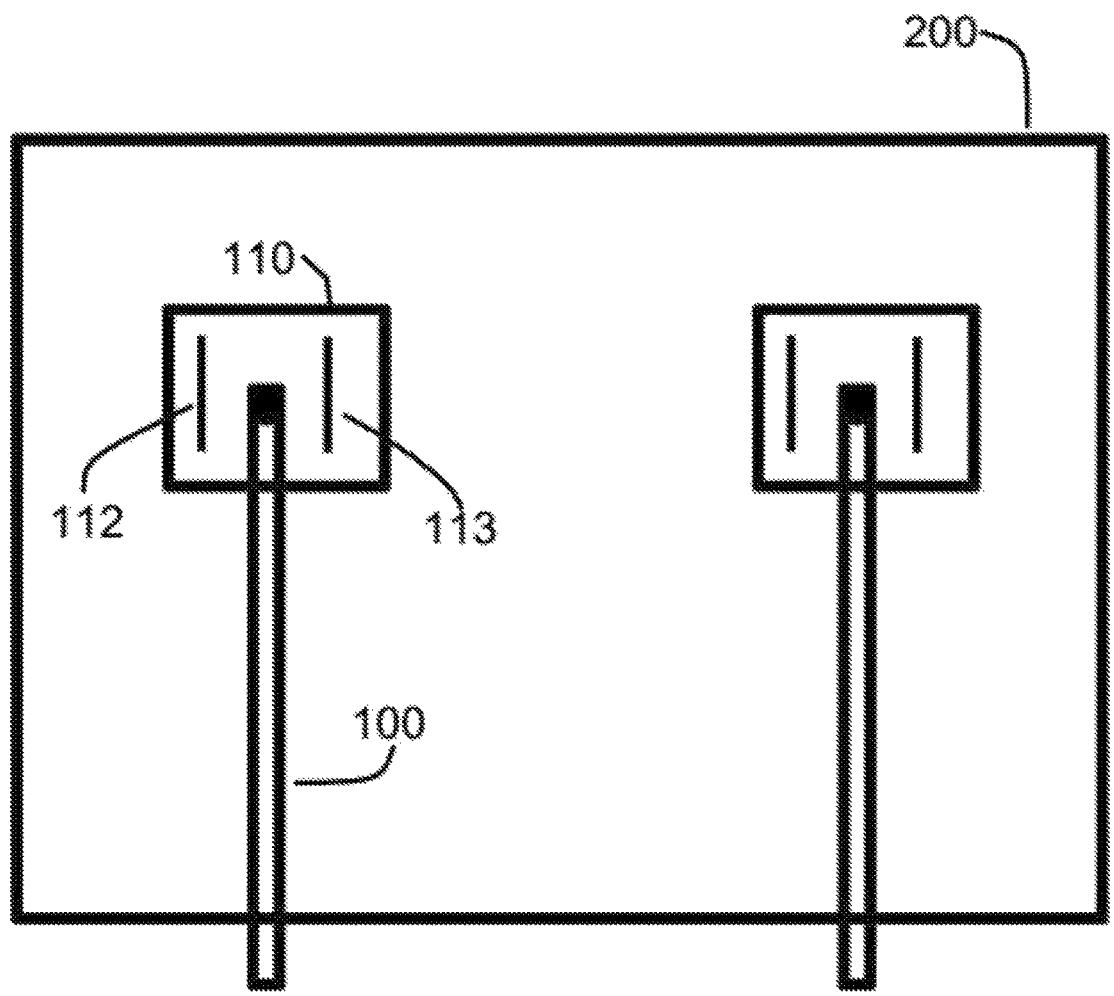
FIG. 13 is a back view of the television illustrating the location of the television brackets and corresponding mounts of the present invention in which at least one of the embodiments of this invention is implemented.

As shown in FIG. 12 and FIG. 13, the primary hole 103 is near the top end of the upper stabilizing arm 101 of television bracket 100 engages with television mount 110. Primary hole 103 aligns with traversing hole 114 as shown in FIGS. 10 and 11, which traverses both the left arm 112 and the right arm 113.

A fastener may traverse through primary hole 103 as shown in FIG. 12 and primary hole 114, as shown in FIGS. 10 and 11. This allows television bracket 100 to fit in the slot formed between the left arm 112 and the right arm 113 of television mount 110. This is shown in FIG. 13, which is a back view of a television 200. Similarly, the lower stabilizing arm 102 pivots about the primary hole 104 and the primary hole 74, as shown in FIG. 20 and FIG. 21.

Figure 14:
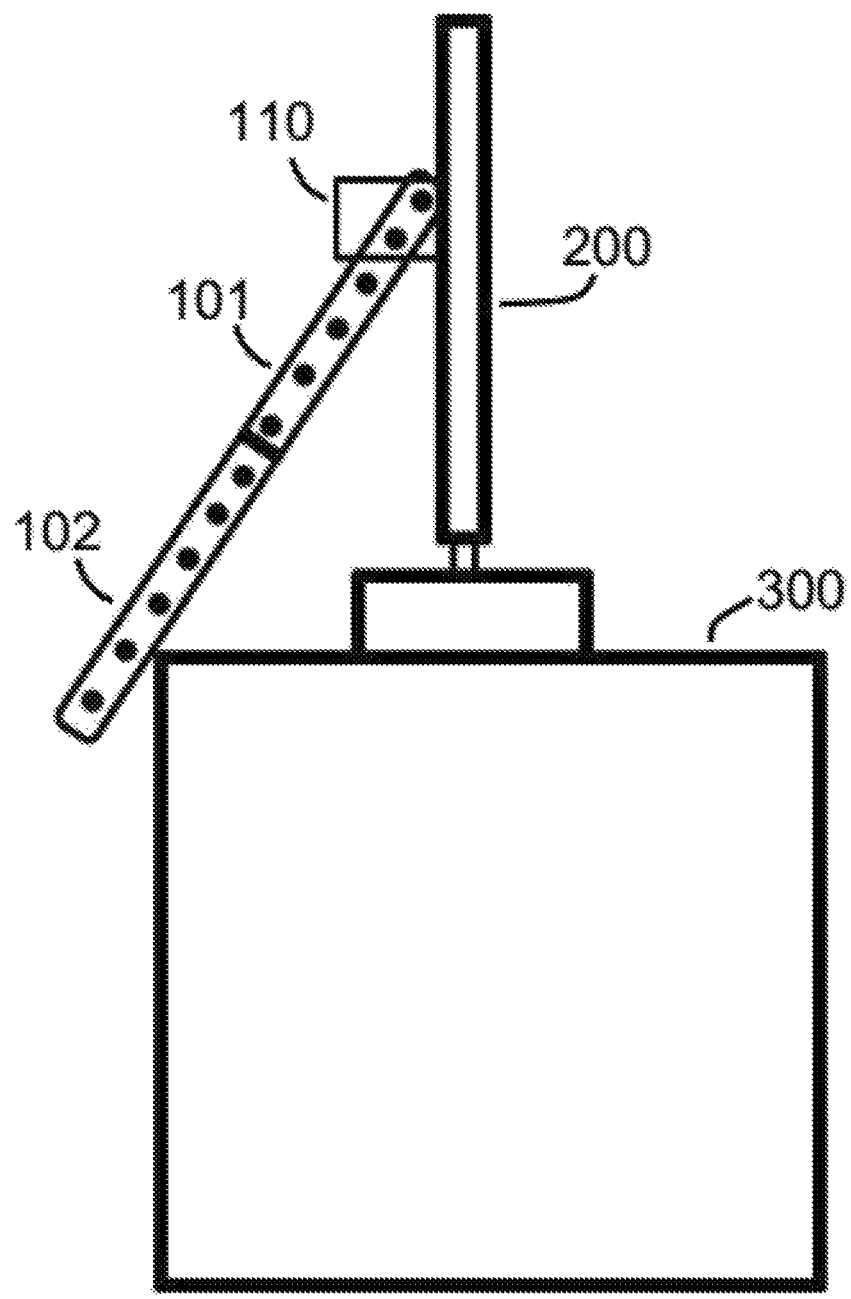
FIG. 14 is a left view of the left television bracket, which comprises an upper stabilizing arm and a lower stabilizing arm, of the present invention in which at least one of the embodiments of this invention is implemented that illustrates its location with respect to the television and the dresser.

FIG. 14, which is a side view of a television 200 on a dresser 300, shows an upper stabilizing arm 101 and a lower stabilizing arm 102 connected to television mount 110.

As shown in FIG. 15, the television mount 115 comprises a plate 125, a left arm 117, and a right arm 118. Television mounting plate 125 comprises a rectangular cross-sectional shape that is secured to the back of the television console on the right hand side.

Also, as shown in FIG. 15 mounting hole 116 extrudes through the television mounting plate 125, and provides a passage for a screw or comparable fastener to attach the respective mount 115 to the television. In addition, FIGS. 15 and 16 shows that left arm 117 and the right arm 118 contain a traversing hole 119.

As shown in FIG. 16, which is a left side view of television mount 115, the right arm 118 is shown protruding from the television mounting plate 125. FIG. 16 also shows traversing hole 119, which aligns with the hole through both the left arm 117 and the right arm 118 as shown in FIG. 15.

Figure 17:
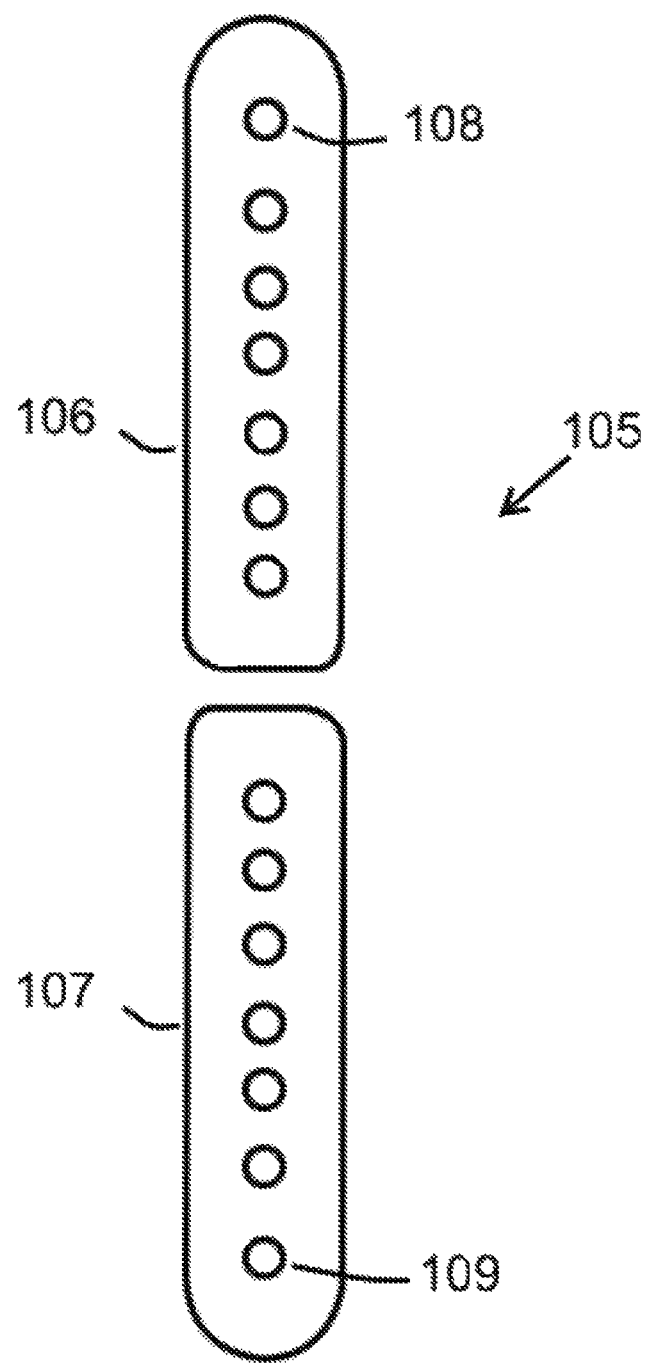
FIG. 17 is a right view of the right television bracket, which comprises an upper stabilizing arm and a lower stabilizing arm, of the present invention in which at least one of the embodiments of this invention is implemented.

As shown in FIG. 17, a plurality of interlocking holes traverses from the primary hole 109 at the distal end of the lower stabilizing arm 107 to the proximal end. The plurality of interlocking holes of the lower stabilizing arm 107 corresponds to the plurality of interlocking holes of the upper stabilizing arm 106 to allow a television to be positioned at various lengths from the back edge of the dresser. Also, as shown in FIG. 17, at least one of the plurality of holes of the upper stabilizing arm 106 and at least one of the plurality of holes of the lower stabilizing arm 107 are concentric with one another. The primary hole 108 of the upper stabilizing arm 106 and the primary hole 109 of the lower stabilizing arm 107 are opposite each other. The adjacent holes of the upper stabilizing arm 106 and the lower stabilizing arm 107 allows the insertion of a screw or comparable fastener which in turn connects the upper stabilizing arm 106 and the lower stabilizing arm 107. In addition, as shown in FIG. 17, the pivoting motion of the upper stabilizing arm 106 and the lower stabilizing arm 107 allows the television to be positioned at a multitude of distances and angles from the back edge of the dresser.

As shown in FIG. 17, upper stabilizing arm 106 comprise a primary hole 108 and a plurality of interlocking holes. The primary hole 108 is near the distal end of the upper stabilizing arm 106. As shown in FIG. 17, primary hole 108 of upper stabilizing arm 106 aligns with traversing hole 119, as shown in FIG. 15 and FIG. 16. The left arm 117 and the right arm 118 are a distance away from each other to create a slot, which corresponds to the width of the upper stabilizing arm 106. The traversing hole 119, as shown in FIG. 15 and FIG. 16, aligns with the primary hole 108 of upper stabilizing arm 106 of television bracket 105, as shown in FIG. 17.

Figure 18:
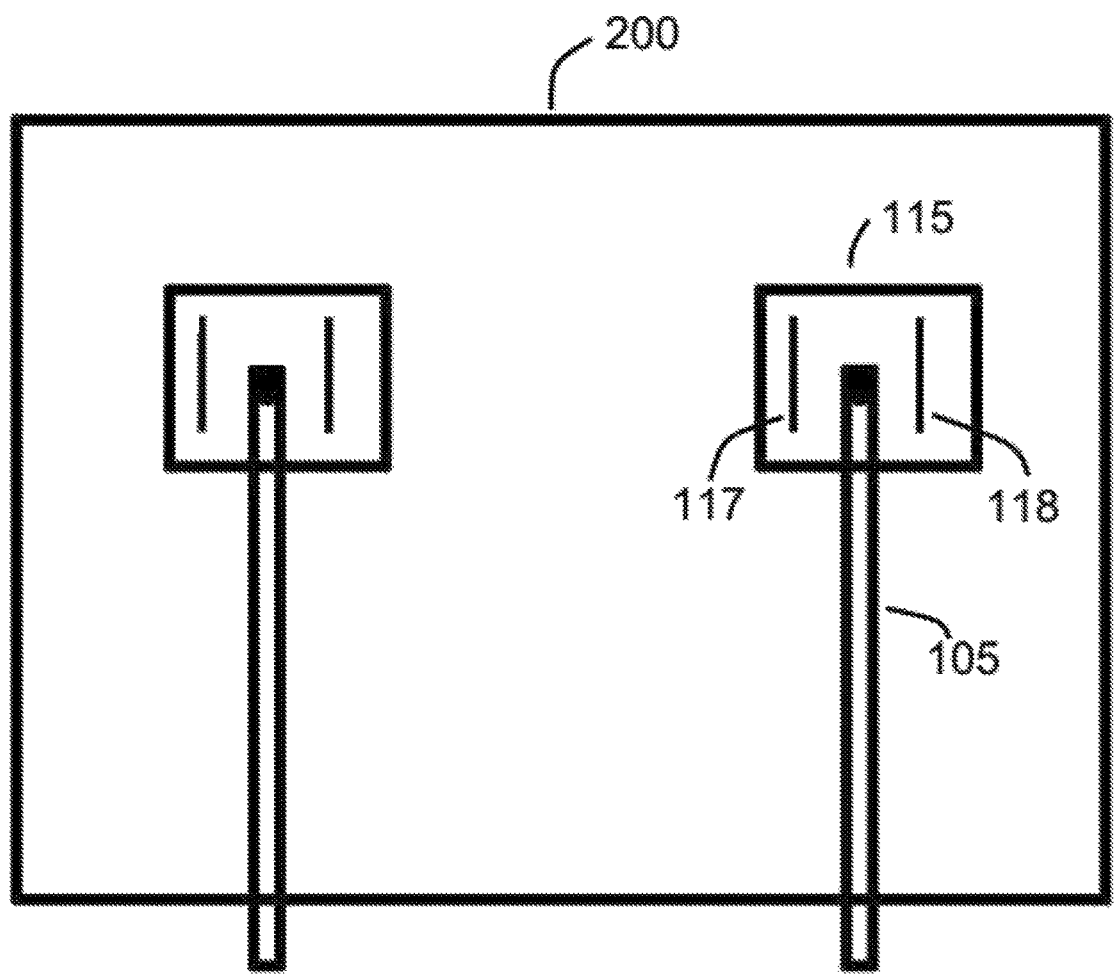
FIG. 18 is a back view of the television illustrating the location of the television brackets and corresponding mounts of the present invention in which at least one of the embodiments of this invention is implemented.

FIG. 18 is a back view of a television 200, which shows the left arm 117 and the right arm 118 of television mount 115 surround the upper stabilizing arm 106 of television bracket 105.

Figure 19:
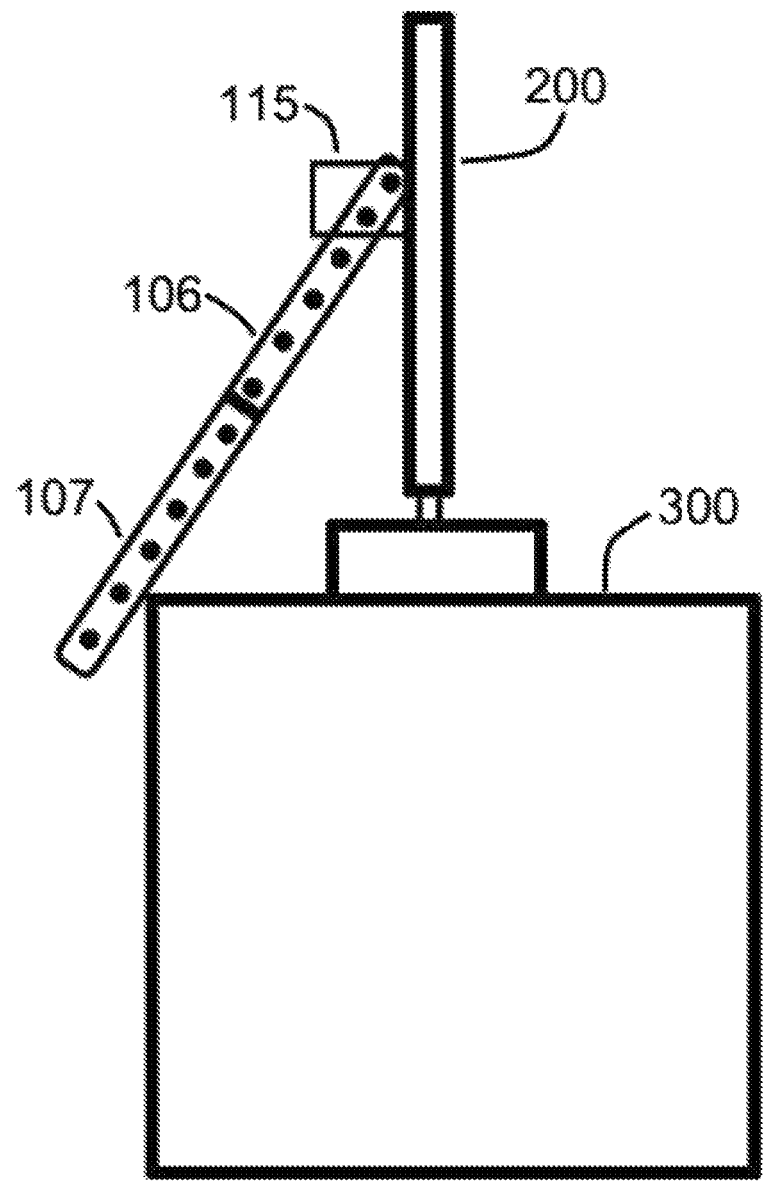
FIG. 19 is a left view of the right television bracket, which comprises an upper stabilizing arm and a lower stabilizing arm, of the present invention in which at least one of the embodiments of this invention is implemented that illustrates its location with respect to the television and the dresser.

FIG. 19, which is a side view of a television 200 on a dresser 300, shows an upper stabilizing arm 106 and lower stabilizing arm 107 connected to television mount 115.

FIG. 20 shows mounting hole 71 extrudes through the dresser mounting plate 60 and provides a passage for a screw or comparable fastener to attach the respective mount 70 to the dresser. In addition, FIG. 20 shows that left arm 72 and the right arm 73 contain a traversing hole 74.

As shown in FIG. 21, which is a left side view of television mount 70, the right arm 73 is shown protruding from the television mounting plate 60. FIG. 21 also shows traversing hole 74, which aligns with the hole through both the left arm 72 and the right arm 73 as shown in FIG. 20.

As shown in FIG. 22, wall mount 20 comprises an upper hole 11 and a lower hole 12 drilled in its wall mounting plate 10 to allow for the passage of a screw or other fastener to connect wall mounting plate 10 to the wall. Also, as shown in FIG. 22, wall mount 20 comprises a traversing hole 21. A screw or another connecting device traverses hole 21, as shown in FIG. 22, and hole 31 as shown in FIG. 23, which allows wall mount 20 to connect to wall bracket 30.

Dresser mount 40, which is shown from a front view in FIG. 24 and a side view in FIG. 25, may be constructed of two parallel pieces of flat material 42 and 43 that may be connected perpendicularly to a relatively flat piece of material that serves as their dresser mounting plates 50. Also, as shown in FIG. 24 mounting hole 41 extrudes through the dresser mounting plate 50, and provides a passage for a screw or comparable fastener to attach the respective mount 40 to the dresser. In addition, FIG. 24 shows that left arm 42 and the right arm 43 contain a traversing hole 44. As shown in FIGS. 24 and 25, a screw or other connecting device traverses hole 44, which goes through left arm 42 and right arm 43 and allows dresser mount 40 to connect to primary hole 32 of wall bracket 30, as shown in FIG. 23.

Figure 26:
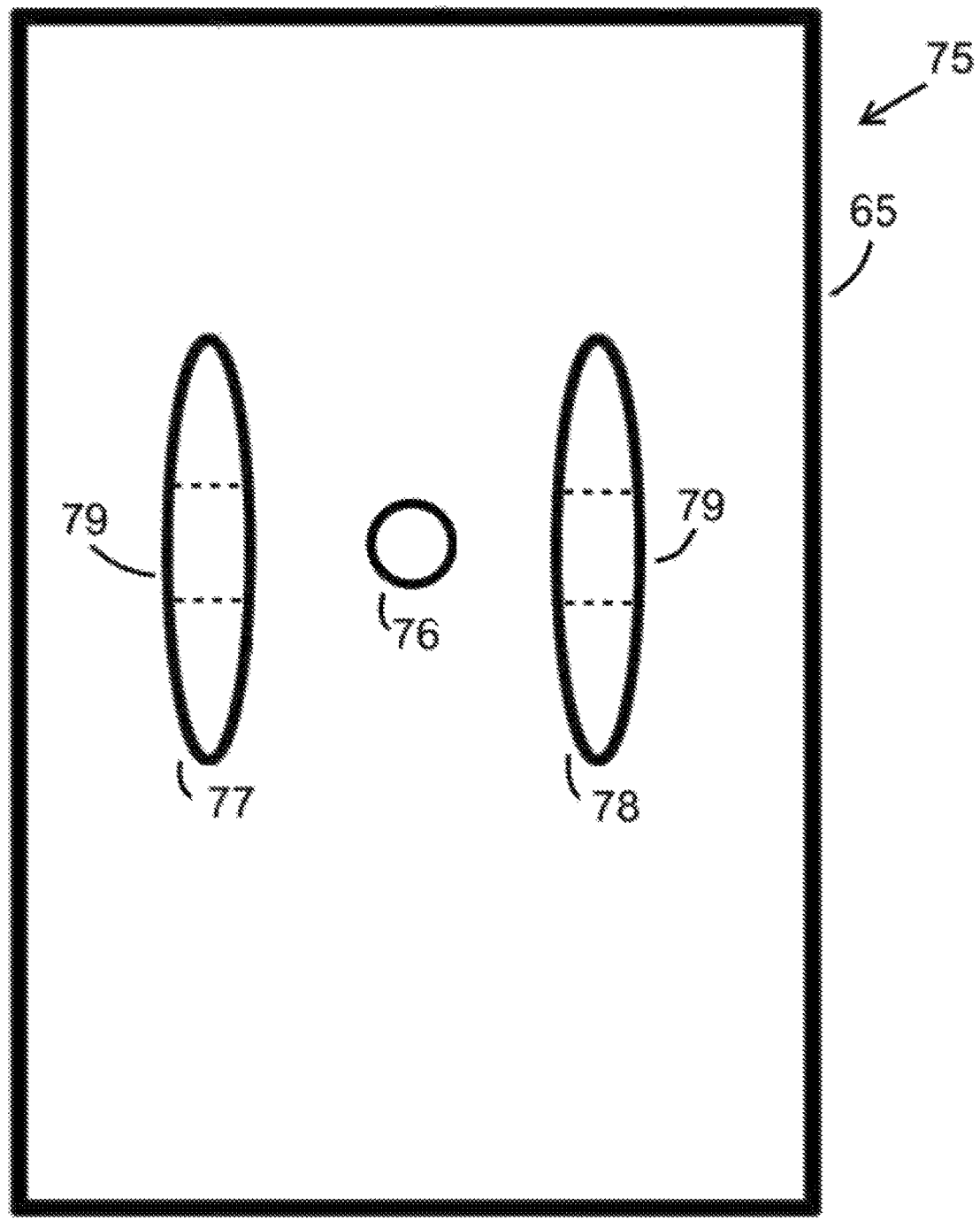
FIG. 26 is a back view of the dresser mount on the right (when viewed from the front), which connects to the right television bracket, of the device of the present invention in which at least one of the embodiments of this invention is implemented.

As shown in FIG. 26, dresser mount 75, which connects to dresser mounting plate 65, is fastened to the dresser through mounting hole 76. Dresser mount 75 may comprise a left arm 77 and a right arm 78. As shown in FIG. 26, hole 79 traverses both the left arm 77 and the right arm 78.

Figure 27:
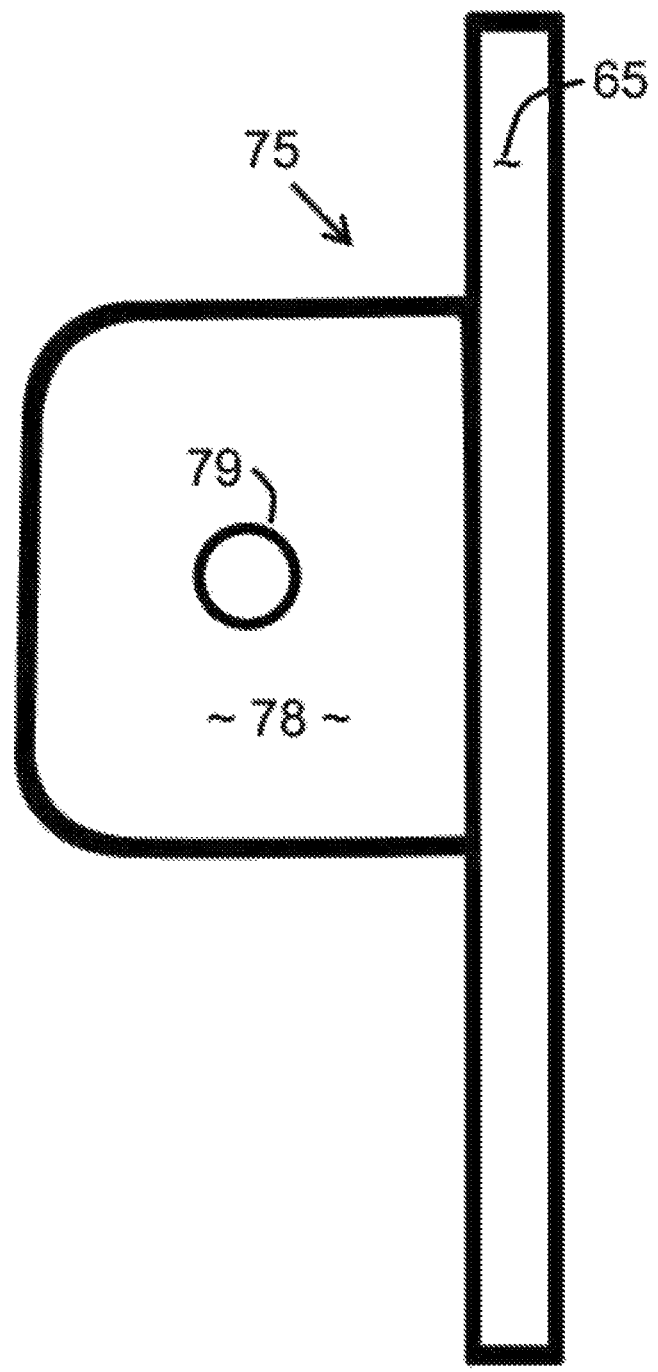
FIG. 27 is a right view of the dresser mount on the right (when viewed from the front), which connects to the right television bracket, of the device of the present invention in which at least one of the embodiments of this invention is implemented.

FIG. 27 shows a side view of the right arm 78 of dresser mount 75 with traversing hole 79, and dresser mounting plate 65. The dresser mount 75 as shown in FIGS. 26 and 27 may be constructed of two parallel pieces of flat material 77 and 78 that may be connected perpendicularly to a relatively flat piece of material that serves as their dresser mounting plates 65. In addition, all of the brackets, mounts, and plates may have either a solid or hollow cross-sectional area.

As shown in FIG. 17, television bracket 105 is comprised of the upper stabilizing arm 106 and the lower stabilizing arm 107. Lower stabilizing arm 107 comprise a primary hole 109 and a plurality of interlocking holes. The primary hole 109 is near the distal end of the lower stabilizing arm 107 and engages with dresser mount 75, as shown in FIGS. 26 and 27. As shown in FIG. 17, the primary hole 109 at the distal end of the lower stabilizing arm 107 lines up with traversing mount hole 79 as shown in FIGS. 26 and 27. This allows a fastener or another type of connection to pass through both primary hole 109 and mount hole 79, as shown in FIGS. 26 and 27. As shown in FIG. 17, dresser mount 75 may be secured to the lower stabilizing arm 107 of television bracket 105. The lower stabilizing arm 107 may remain in the slot between the left arm 77 and the right arm 78 of television mount 75, as shown in FIG. 26.

Figure 29:
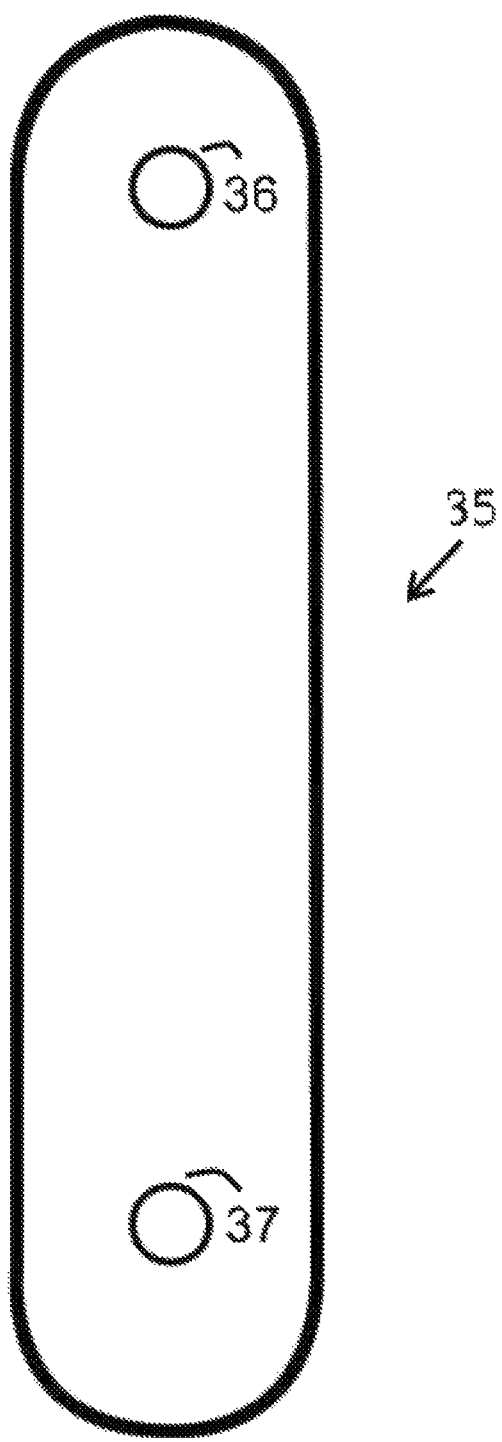
FIG. 29 is a right view of the right wall bracket of the present invention in which at least one of the embodiments of this invention is implemented.

As shown in FIG. 28, wall mount 25 comprises a traversing hole 26. As also shown in FIG. 29, wall bracket 35 comprise a hole 36 at the distal end near the wall, and a hole 37 at the proximal end near the dresser. A screw or other connecting device traverses hole 26 shown in FIG. 28, and hole 36 shown in FIG. 29, which allows wall mount 25 to connect to wall bracket 35.

Figure 30:
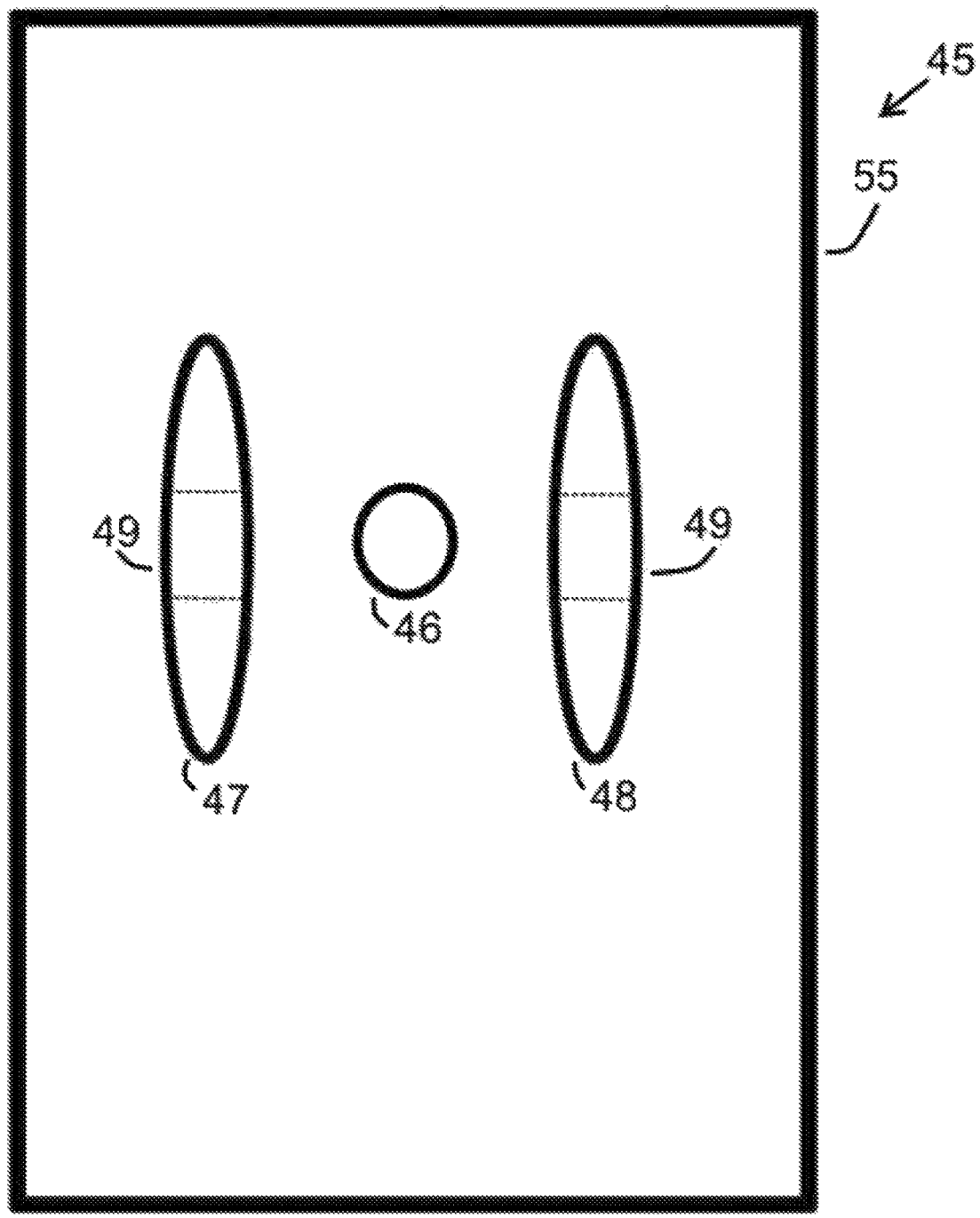
FIG. 30 is a back view of the dresser mount on the right (when viewed from the front), which connects to the right wall bracket, of the device of the present invention in which at least one of the embodiments of this invention is implemented.
Figure 31:
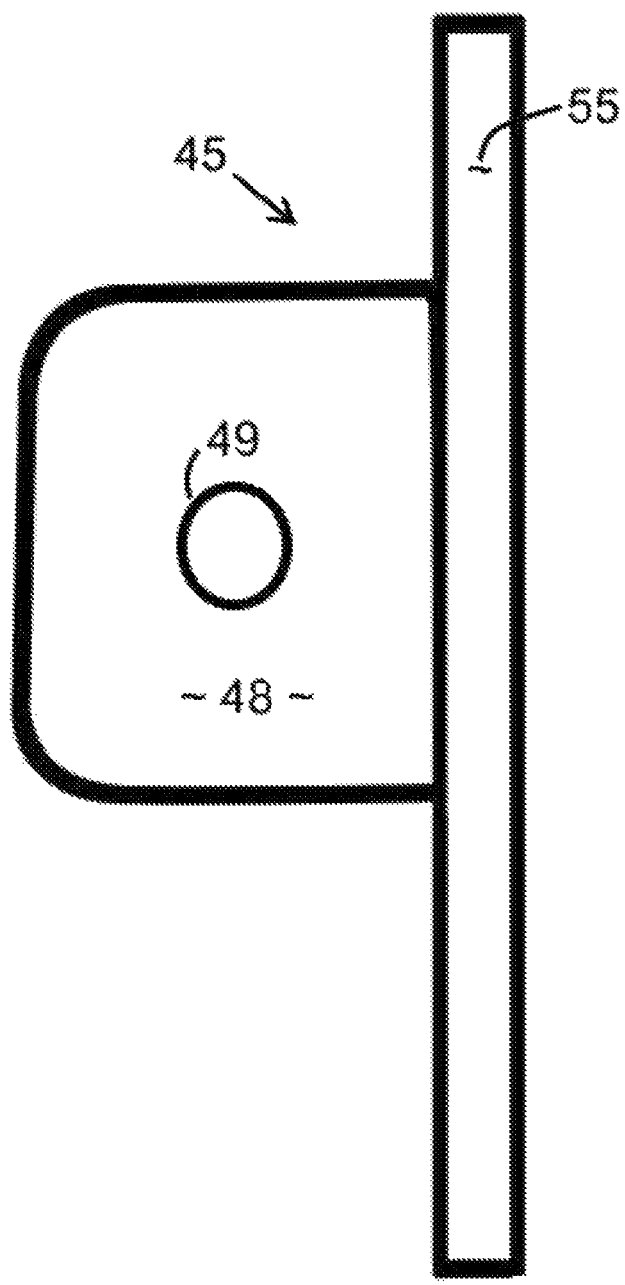
FIG. 31 is a right view of the dresser mount on the right (when viewed from the front), which connects to the right wall bracket, of the device of the present invention in which at least one of the embodiments of this invention is implemented.

Dresser mount 45 is connected to dresser mounting plate 55, which is shown from a front view in FIG. 30 and a side view in FIG. 31. Dresser mount 45 may be constructed by connecting two parallel pieces of flat material 47 and 48 perpendicularly to a relatively flat piece of material that serves as a dresser mounting plate 55. Also, as shown in FIG. 30, dresser mount 45 comprises a mounting hole 46, which allows it to attach to center dresser plate 90.

As shown in FIGS. 30 and 31, a hole 49 traverses the left arm 47 and the right arm 48. As shown in FIG. 31, a screw or other connecting device traverses hole 49, which aligns with hole 37 as shown in FIG. 29. This allows dresser mount 45, as shown in FIGS. 30 and 31, to connect to wall bracket 35, as shown in FIG. 29.

In order to use the present invention, the user may attach each television mount 110 and 115 behind the television 200. The user does so by inserting a screw or other fastener into the mounting holes 11 of the television mounts 110 and 115.

Next, the user may attach television brackets 100 and 105 to their television mounts 110 and 115, respectively. The user does so by inserting a screw or other fastener through the traversing holes 114 and 119 of their television mounts 110 and 115, respectively.

The television mounts 110 and 115 of each of the television brackets 100 and 105 are equidistant from the center of the television. The user then inserts the upper stabilizing arm 101 and 106 into the slots of the respective television mounts 110 and 115 and aligns the primary holes 103 and 108 of the respective upper stabilizing arms 101 and 106, so that the user may connect these with a screw or other fastener.

Next, the user may then attach the lower stabilizing arm 102 and 107 to the respective upper stabilizing arms 101 and 106 by aligning one of the interlocking holes of the upper stabilizing arm with one of the interlocking holes of the lower stabilizing arm. The user then presses each lower stabilizing arm against its respective upper stabilizing arm and inserts a screw or other fastener to connect these.

Next, the user mounts the center dresser plate 90 behind the dresser 300, adjacent the upper edge of the dresser 300 by inserting screws or other fasteners through the plurality of holes of the center dresser plate 90. The user then inserts a screw or other fastener into a hole corresponding to each of the corners of the center dresser plate 90. Next, the user attaches the dresser mounts 40, 45, 70, and 75 to the center dresser plate 90 via screws or other fasteners. The primary holes 104 and 109 of lower stabilizing arms 102 and 107, respectively, are connected to traversing holes 74 and 79 of their respective dresser mounts 70 and 75 via a screw or other fastener. At this point, the television is completely fastened to the dresser.

Next, the user attaches the dresser mounts 40 and 45 to the center dresser plate 90 via screws or other fasteners. The primary holes 32 and 37 of wall brackets 30 and 35, respectively, are connected to traversing holes 44 and 49 of their respective dresser mounts 40 and 45 via a screw or other fastener.

Next, the primary holes 31 and 36 on the other end of wall brackets 30 and 35 are aligned with the traversing holes 21 and 26 of their respective wall mounts 20 and 25 and connected via a screw or other fastener. Next, wall mounts 20 and 25 are connected to the wall by inserting screws or other fasteners through their respective upper holes 11 and 16 and their lower holes 12 and 17. At this point, the dresser is completely fastened to the wall. At this point the television and the dresser are stabilized so that both do not accidentally fall or tip over creating damage. A lock may be used as a fastening device to reduce the chances of either the television or furniture from being stolen.

Although the invention has been explained in relation to several different embodiments, it is to be understood that many other possible modifications and variations can be made without departing from the spirit and scope of the invention.

All of these embodiments and the invention disclosed herein are intended to be within the scope herein disclosed. These and other embodiments of the invention will become readily apparent to those skilled in the art from the detailed description of the embodiments having reference to the attached figures, the embodiments not being limited to any particular embodiments disclosed. Also, the invention disclosed herein suitably may be practiced in the absence of any element which is not specifically disclosed herein.

The invention claimed is:

1. A device for preventing movement of a television and a dresser, the device comprising,
   a. at least one wall bracket, said wall bracket having a distal end and a proximal end, wherein said distal end of said wall bracket connects to a wall, and said proximal end of said wall bracket connects to the dresser;
   b. at least one television bracket, said television bracket having a distal end and a proximal end, wherein the distal end of the television bracket connects to a television, and the proximal end of the television bracket connects to the dresser;
   c. wherein said distal end of the wall bracket comprises a wall mount and means for connecting the distal end of the wall bracket to the wall, and wherein the proximal end of the wall bracket comprises a dresser mount and means for connecting the proximal end of the wall bracket to the dresser;
   d. wherein said wall mount having a wall mounting plate comprises:
      i. at least one traversing hole and a wall connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock; and
      ii. at least one arm with a traversing hole and a wall bracket connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock;
   e. wherein said dresser mount having a dresser mounting plate comprises:
      i. at least one traversing hole and a dresser connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock; and
      ii. at least one arm with a traversing hole and a bracket connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock;
   f. wherein a dresser plate is used between the dresser mounting plate and the dresser for connecting the dresser mounting plate to the dresser.

2. The device of claim 1, wherein said distal end of the television bracket comprises a television mount and means for connecting the distal end to a television, and wherein the proximal end comprises a dresser mount and means for connecting the proximal end to a dresser.

3. The device of claim 2, wherein said television mount having a television mounting plate comprises:
   a. at least one traversing hole and a television connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock; and
   b. at least one arm with a traversing hole, and a television bracket connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock.

4. The device of claim 3, wherein said dresser mount having a dresser mounting plate comprises:
   a. at least one traversing hole and a dresser connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock; and
   b. at least one arm with a traversing hole and a bracket connection selected from a group consisting of at least one screw, key, pin, peg, rivet, cotter pin, nail, spike, bolt, stud, staple, boss, clamp, clip, dowel, stake, hook, anchor, tie, ring, band, crimp, wedge, adhesive, shackle of a padlock, and shank of a padlock.

5. The device of claim 4, wherein a dresser plate is used between the dresser mounting plate and the dresser for connecting the dresser mounting plate to the dresser.

6. The device of claim 5, wherein the device is constructed of a material selected from a group consisting of plastic, metal, glass, or wood.

7. The device of claim 6, wherein the dresser is selected from a group consisting of a bookcase, wall unit, hutch, armoire, cabinet, cupboard, bureau, chest of drawers, sideboard, buffet, credenza, highboy, tallboy, wardrobe, chiffonier, china cabinet, file cabinet, medicine cabinet, fireplace mantel, and any other movable fixture such as a table or stand.

8. The device of claim 7, wherein a connection is selected from a group consisting of a screw, key, pin, peg, rivet, cotter pin, nail, spike, bolt, stud, staple, boss, clamp, clip, dowel, stake, hook, anchor, tie, ring, band, crimp, wedge, and adhesive.

9. The device of claim 8, wherein the television is selected from a group consisting of three-dimensional televisions, 3D televisions, high-definition televisions, HDTV, three-dimensional high-definition televisions, 3D HDTV, televisions with integrated media or game units, flat-panel displays, flat-screen displays, computer monitors, monitors with integrated computers, all-in-one computer screens, electronic and non-electronic picture frames, laptops, notebooks, 2-in-1 computers, tablet computers, digital screens integrated with an appliance, and any present or future device that is capable of falling over or off a dresser or similar object screw, key, pin, peg, rivet, cotter pin, nail, spike, bolt, stud, staple, boss, clamp, clip, dowel, stake, hook, anchor, tie, ring, hand, crimp, wedge, adhesive, shackle of a padlock and, shank of a padlock.

10. The device of claim 9, wherein at least one wall bracket comprising a cross-sectional area selected from a group consisting of round, oval, elliptical, square, rectangular, circular, non-circular, oval, rounded rectangular, triangular, square, hexagonal, parallelogram, oblong, octagonal and combinations thereof.

11. The device of claim 10, wherein at least one television bracket has an upper stabilizing arm and a lower stabilizing arm, comprising:
   a. the upper stabilizing arm comprises a primary hole near the distal end that engages with the television mount and a plurality of interlocking holes on the proximal end that engages with the lower stabilizing arm;

b. the lower stabilizing arm comprises a primary hole near the distal end that engages with the dresser mount and a plurality of interlocking holes on the proximal end that engages with the upper stabilizing arm.

12. The device of claim 11, wherein at least one wall bracket has an upper stabilizing arm and a lower stabilizing arm, comprising:
   a. the upper stabilizing arm comprises a primary hole near the distal end that engages with the wall mount and on the proximal end a cross-sectional area that engages with the lower stabilizing arm selected from a group consisting of round, oval, elliptical, square, rectangular, circular, non-circular, oval, rounded rectangular, triangular, square, hexagonal, parallelogram, oblong, octagonal and combinations thereof;
   b. the lower stabilizing arm comprises a primary hole near the distal end that engages with, the dresser mount and on the proximal end a cross-sectional area that engages with the lower stabilizing arm selected from a group consisting of round, oval, elliptical, square, rectangular, circular, non-circular, oval, rounded rectangular, triangular, square, hexagonal, parallelogram, oblong, octagonal and combinations thereof;
   c. a plurality of interlocking holes that engage with the upper stabilizing arm.

13. The device of claim 12, wherein a wall plate is used between the wall mounting plate and the wall for connecting the wall mounting plate to the wall.

14. The device of claim 13, wherein a television mounting plate is used between the television mounting plate and the television for connecting the television mounting plate to the television.

\* \* \* \* \*